(12) United States Patent
Schmitt et al.

(10) Patent No.: US 9,480,925 B2
(45) Date of Patent: Nov. 1, 2016

(54) IMAGE CONSTRUCTION GAME

(71) Applicants: Edward A. Schmitt, Richboro, PA (US); Richard R. Clikeman, Doylestown, PA (US)

(72) Inventors: Edward A. Schmitt, Richboro, PA (US); Richard R. Clikeman, Doylestown, PA (US)

( * ) Notice: Subject to any disclaimer, the term of this patent is extended or adjusted under 35 U.S.C. 154(b) by 0 days.

(21) Appl. No.: 14/670,926

(22) Filed: Mar. 27, 2015

(65) Prior Publication Data
US 2015/0273336 A1 Oct. 1, 2015

Related U.S. Application Data

(60) Provisional application No. 61/971,136, filed on Mar. 27, 2014.

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/63 | (2014.01) |
| A63F 13/537 | (2014.01) |
| A63F 13/49 | (2014.01) |
| A63F 13/46 | (2014.01) |

(52) U.S. Cl.
CPC .............. *A63F 13/63* (2014.09); *A63F 13/46* (2014.09); *A63F 13/49* (2014.09); *A63F 13/537* (2014.09)

(58) Field of Classification Search
USPC ............................ 463/20, 22, 25, 30, 31, 39
See application file for complete search history.

(56) References Cited

U.S. PATENT DOCUMENTS

| 5,802,361 | A | 9/1998 | Wang et al. |
| 6,295,370 | B1 | 9/2001 | D'Hooge |
| 7,686,682 | B2 | 3/2010 | Diakopoulos et al. |
| 7,878,891 | B2 | 2/2011 | Chiu |
| 7,980,953 | B2 | 7/2011 | von Ahn Arellano |
| 8,195,005 | B2 | 6/2012 | Huang |
| 8,369,619 | B2 | 2/2013 | Kim et al. |
| 2001/0049297 | A1* | 12/2001 | Hibscher ................. A63F 13/12 463/9 |
| 2004/0175045 | A1 | 9/2004 | Cha |
| 2005/0220348 | A1* | 10/2005 | Chiu ................. G06F 17/30793 382/194 |
| 2006/0062456 | A1 | 3/2006 | Chiu et al. |
| 2009/0144033 | A1 | 6/2009 | Liu et al. |
| 2009/0219379 | A1* | 9/2009 | Rossato ................ G06T 7/0083 348/14.01 |
| 2009/0265383 | A1 | 10/2009 | Sanyal et al. |
| 2009/0304269 | A1* | 12/2009 | Willis ..................... G06T 11/60 382/162 |

FOREIGN PATENT DOCUMENTS

EP 2111901 B1 2/2012

* cited by examiner

*Primary Examiner* — Adetokunbo O Torimiro
(74) *Attorney, Agent, or Firm* — Richard R. Clikeman

(57) ABSTRACT

An image construction computer game method is disclosed. Further disclosed are: a system for image construction formulated as a game; a system for performing the method; a computer-executable program stored on a non-transitory computer-readable storage medium, the program including the method; and an image processing apparatus that can record the method program in a storing section.

20 Claims, 23 Drawing Sheets
(17 of 23 Drawing Sheet(s) Filed in Color)

GNI1

GNI2

GNI3

GNI4

GNI5

GNI6

| Name | Image |
|---|---|
| TLN16a |  |

| Name | Image |
|---|---|
| CLN11a |  |
| CLN12a |  |
| CLN13a |  |
| CLN14a |  |

| Name | Image |
|---|---|
| CLN15a |  |
| CLN16a |  |
| CLN16b |  |
| CLN16c |  |

| Name | Image |
|---|---|
| MTNI6a |  |

| Name | Image | SQMV |   | Name | Image | SQMV |
|---|---|---|---|---|---|---|
| PMCNI1a |  | 0.656 |   | PMCNI5a |  | 0.573 |
| PMCNI2a |  | 0.470 |   | PMCNI6a |  | 0.837 |
| PMCNI3a |  | 0.402 |   | PMCNI6b |  | 0.997 |
| PMCNI4a |  | 0.654 |   | PMCNI6c |  | 1.000 |

801

| Matchup Numerical Images | | MTNI6 | | | | 802 |
|---|---|---|---|---|---|---|
| | | b | c | d | e | |
| MCNI1 | b | 0.460 | 0.308 | 0.413 | 0.293 | Numerical Score = 0.460  803 |
| | c | 0.390 | 0.367 | 0.428 | 0.477 | |
| | d | 0.243 | 0.220 | 0.210 | 0.218 | |
| | e | 0.377 | 0.401 | 0.414 | 0.549 | |
| | | Numerical Similarity | | | | |

| Matchup Numerical Images | | MTNI6 | | | | 902 |
|---|---|---|---|---|---|---|
| | | b | c | d | e | |
| MCNI1 | b | (0.460) | 0.308 | 0.413 | 0.293 | |
| | c | 0.390 | 0.367 | 0.428 | 0.477 | |
| | d | 0.243 | 0.220 | 0.210 | 0.218 | |
| | e | 0.377 | (0.401) | 0.414 | 0.549 | |
| | | Numerical Similarity | | | | |

901

903

Numerical Score = 0.861

1001

|  |  | MTNI6 | | | |
|---|---|---|---|---|---|
| Matchup Numerical Images | | b | c | d | e |
| MCNI1 | b | 0.460 | 0.308 | 0.413 | 0.293 |
|  | c | 0.390 | 0.367 | 0.428 | 0.477 |
|  | d | 0.243 | 0.220 | 0.210 | 0.218 |
|  | e | 0.377 | 0.401 | 0.414 | 0.549 |
|  | | Numerical Similarity | | | |

1002

Numerical Score = 1.289

1003

| Matchup Numerical Images | | MTNI6 | | | | 1102 | 1103 |
| --- | --- | --- | --- | --- | --- | --- | --- |
| | | b | c | d | e | | |
| MCNI1 | b | 0.460 | 0.308 | 0.413 | 0.293 | | Numerical Score = 1.838 |
| | c | 0.390 | 0.367 | 0.428 | 0.477 | | |
| | d | 0.243 | 0.220 | 0.210 | 0.218 | | |
| | e | 0.377 | 0.401 | 0.414 | 0.549 | | |
| | | Numerical Similarity | | | | | |

1201

| Matchup Numerical Images | | MTNI6 | | | |
|---|---|---|---|---|---|
| | | b | c | d | e |
| MCNI1 | b | 0.460 | 0.308 | 0.413 | 0.293 |
| | c | 0.390 | 0.367 | 0.428 | 0.477 |
| | d | 0.243 | 0.220 | 0.210 | 0.218 |
| | e | 0.377 | 0.401 | 0.414 | 0.549 |
| | | Numerical Similarity | | | |

1202

Numerical Score = 1.528

1203

1301

| Matchup Numerical Images | MTNI6 | | | | 1302 |
|---|---|---|---|---|---|
| | b | c | d | e | |
| MCNI1 | b | 0.816 | 0.938 | 0.562 | 0.432 |
| | c | 0.837 | 0.963 | 0.577 | 0.444 |
| | d | 0.562 | 0.489 | 0.816 | 0.943 |
| | e | 0.659 | 0.573 | 0.957 | 0.804 |
| | Numerical Similarity | | | | |

1303
Numerical Score = 3.679

Figure 16

| Matchup Numerical Images | | MTNI6 | | | |
|---|---|---|---|---|---|
| | | b | c | d | e |
| MCNI1 | b | 0.460 | 0.308 | 0.413 | 0.293 |
| | c | 0.390 | 0.367 | 0.428 | 0.477 |
| | d | 0.243 | 0.220 | 0.210 | 0.218 |
| | e | 0.377 | 0.401 | 0.414 | 0.549 |
| | | | | | |
| MCNI2 | b | 0.131 | 0.147 | 0.030 | 0.029 |
| | c | 0.300 | 0.311 | 0.134 | 0.131 |
| | d | 0.132 | 0.148 | 0.031 | 0.029 |
| | e | 0.192 | 0.209 | 0.058 | 0.054 |
| | | | | | |
| MCNI3 | b | 0.127 | 0.001 | 0.106 | 0.062 |
| | c | 0.232 | 0.014 | 0.157 | 0.104 |
| | d | 0.256 | 0.001 | 0.150 | 0.062 |
| | e | 0.160 | 0.007 | 0.123 | 0.070 |
| | | | | | |
| MCNI4 | b | 0.293 | 0.244 | 0.441 | 0.415 |
| | c | 0.452 | 0.484 | 0.643 | 0.661 |
| | d | 0.265 | 0.227 | 0.347 | 0.366 |
| | e | 0.468 | 0.656 | 0.493 | 0.474 |
| | | Numerical Similarity | | | |

Figure 18

| Matchup Numerical Images | | MTNI6 | | | |
|---|---|---|---|---|---|
| | | b | c | d | e |
| MCNI1 | b | 0.460 | 0.308 | 0.413 | 0.293 |
| | c | 0.390 | 0.367 | 0.428 | 0.477 |
| | d | 0.243 | 0.220 | 0.210 | 0.218 |
| | e | 0.377 | 0.401 | 0.414 | 0.549 |
| MCNI2 | b | 0.131 | 0.147 | 0.030 | 0.029 |
| | c | 0.300 | 0.311 | 0.134 | 0.131 |
| | d | 0.132 | 0.148 | 0.031 | 0.029 |
| | e | 0.192 | 0.209 | 0.058 | 0.054 |
| MCNI3 | b | 0.127 | 0.001 | 0.106 | 0.062 |
| | c | 0.232 | 0.014 | 0.157 | 0.104 |
| | d | 0.256 | 0.001 | 0.150 | 0.062 |
| | e | 0.160 | 0.007 | 0.123 | 0.070 |
| MCNI4 | b | 0.293 | 0.244 | 0.441 | 0.415 |
| | c | 0.452 | 0.484 | 0.643 | 0.661 |
| | d | 0.265 | 0.227 | 0.347 | 0.366 |
| | e | 0.468 | 0.656 | 0.493 | 0.474 |
| | | Numerical Similarity | | | |

IMAGE CONSTRUCTION GAME

This patent application derives priority from: U.S. provisional patent application Ser. No. 60/971,136, filed Mar. 27, 2014.

BACKGROUND OF THE INVENTION

The present invention relates to an image construction computer game method, a computer-executable program including the image construction computer game method, stored on a non-transitory computer-readable storage medium; a non-transitory computer-readable storage medium on which there has been stored a computer-executable program for the method; and a computer game device that can record the image construction computer game method program in a storing section.

U.S. Pat. No. 7,878,891B2 is directed to generation of and video game play utilizing jigsaw puzzle style photominoes provided by constructing polyomino puzzle pieces from portions of digital photographic images. This patent is directed to using a digital photograph and masking it with template areas that are polyominoes, wherein a polomino is made up of square blocks, each of which is abutted on at least one side to another block. For example, a pentomino has five contiguous squares. A plurality of saliency scores is computed for each piece based on variation in texture, colors, shapes, a face, a person, and a center of the image. Saliency scores are linked to locations in the original photograph and can be used to determine if a polyomino piece has been properly placed.

While the game of U.S. Pat. No. 7,878,891B2 provides for combining aspects of dominoes and jigsaw puzzle games, allowing for reconstruction of a digital photographic image, and facilitates such reconstruction through analysis of polyominoes versus a map of the entire digital photographic image, the game is limited to the reconstruction of the original image.

In contrast, the following non-exhaustive example illustrates the present invention that constructs comparison numerical images, differing from a target numerical image, for comparison with that target numerical image rather than, as disclosed in U.S. Pat. No. 7,878,891B2, reconstructing an original image using pieces directly derived from that original image. The following non-exhaustive illustrative example of the image construction game of the present invention is directed to transforming germinal numerical images, which may be gathered from a wide variety of sources, both digital and pre-digital, and which differ significantly from a target numerical image, into one or more sets of linked comparison numerical images from which color numerical images may be selected for matching with color target numerical images. The player is tasked with identifying and applying a transform or transforms to the germinal numerical image that will cause the transformed image to be more similar to the target numerical image with which it will be compared. Scoring indicates the degree to which the player has been successful.

Due to the nearly endless variety of germinal numerical images that can be gathered for inclusion in the germinal numerical image library of the present invention and due to the great variety in type of transform that may be applied toward conversion of germinal numerical images into comparison numerical images, there is almost no end to the variety, intrigue, stimulation, or analytical reach the game of the present invention can bring to its players regardless of player skill level. A non-limiting list of what the game of the present invention can provide, then, includes: highly varied, intriguing, and stimulating game play for single players, a few players, or for a large or massive number of players; analysis of data; training of players to enhance skills in color evaluation and modification through game play; creation of new artwork through game play; and brain function maintenance and improvement.

SUMMARY OF THE INVENTION

One aspect of the present invention is directed to a computer implemented method for an image construction game, the method including: at a computer system including one or more processors and non-transitory computer-readable storage medium storing one or more programs, the one or more processors executing the one or more programs, performing the steps of:

A. providing a germinal numerical image library including one or more germinal numerical image,
   wherein each germinal numerical image is a numerical image that is: available to initiate constructing of a linked numerical image set, through forming of one or more linked numerical image,
   wherein the linked numerical image is derived from the germinal numerical image through the operation of one or more transform operating in a specified order, and
   wherein a transform is a mathematical operation capable of transforming one numerical image into another numerical image;

B. constructing a target linked numerical image set, the constructing the target LNI set including the steps of:
   selecting one germinal numerical image; and
   populating the target linked numerical image set with one or more target linked numerical image, at least one of which is a color numerical image, and each of which is formed by the further steps of:
      specifying one or more transform;
      specifying an order in which the one or more transforms are to operate upon the germinal numerical image to form the target linked numerical image; and
      forming the target linked numerical image through the operating, upon the germinal numerical image, of the one or more transform in the specified order;

C. constructing a comparison linked numerical image set, the constructing the comparison LNI set including the steps of:
   selecting one germinal numerical image; and
   populating the comparison linked numerical image set with one or more comparison linked numerical image, at least one of which is a color numerical image, and each of which is formed by the further steps of:
      specifying one or more transform;
      specifying an order in which the one or more transforms are to operate upon the germinal numerical image to form the comparison linked numerical image; and
      forming the comparison linked numerical image through the operating, upon the germinal numerical image, of the one or more transform in the specified order;

D. assigning one or more target linked numerical image from one or more target linked numerical image set to be a matchup target numerical image, wherein the target linked numerical image is a color numerical image;

E. choosing one or more comparison linked numerical image from one or more comparison linked numerical image set to be a matchup comparison numerical image, wherein the comparison linked numerical image is a color numerical image;

F. comparing one or more matchup comparison numerical image with one or more matchup target numerical image, wherein the comparing includes the steps of:
calculating a target numerical descriptor, based on the one or more matchup target numerical image;
calculating a comparison numerical descriptor, based on the one or more matchup comparison numerical image;
and
calculating a numerical similarity, based on the comparison numerical descriptor and the target numerical descriptor;

G. calculating a numerical score, based on one or more numerical similarity.

A second aspect of the present invention is directed to computer system for image construction formulated as a game including: a non-transitory computer-readable storage medium wherein the storage medium includes a computer-executable program for performing the method of the present invention, and a processor in communication with the storage medium; wherein the system further includes: a germinal numerical image library; a user interface controller; a germinal numerical image library providing component for providing the germinal numerical image library; a numerical image transformation component for transforming one numerical image into another numerical image; a target LNI set construction component for constructing a target linked numerical image set; a comparison LNI set construction component for constructing a comparison linked numerical image set; a target LNI assignment component for assigning one or more target linked numerical image to be a matchup target numerical image; a comparison LNI choice component for choosing a comparison linked numerical image to be a matchup comparison numerical image; a matchup numerical image comparing component for comparing one or more matchup comparison numerical image with one or more matchup target numerical image; and a numerical score calculation component for calculating a numerical score.

A third aspect of the present invention is directed to an image processing apparatus including:

A. a non-transitory computer-readable storage medium further including:
a computer-executable program for performing the method of the present invention, and a numerical image storing section;

B. a derivative numerical image calculator for calculating: a comparison linked numerical image from a germinal numerical image, a target linked numerical image from a germinal numerical image; and combinations thereof;

C. a numerical descriptor calculator for: calculating a target numerical descriptor, based on the one or more matchup target numerical image; and calculating a comparison numerical descriptor, based on the one or more matchup comparison numerical image;

D. a numerical similarity calculator for calculating a numerical similarity, based on the comparison numerical descriptor and the target numerical descriptor; and E. a numerical score calculator for calculating a numerical score, based on one or more numerical similarity.

BRIEF DESCRIPTION OF THE DRAWINGS

FIGS. 4 through 15, and 17 contain viewable images that represent the color numerical images from which they were rendered, and to which they are, therefore, linked. Each of those numerical images is actually a 32-bit color numerical image that would typically be rendered as a 32-bit color viewable image. However, for purposes of illustration in the present patent document, each 32 bit color numerical image has been rendered as a grayscale viewable image. Further, whenever a viewable image is labeled in a figure or description of a figure, the label will indicate the numerical image from which the viewable image has been rendered.

FIG. 4 depicts germinal numerical images (GMI) of a germinal numerical image library available for originating linked numerical image sets, the members of which may be used in rounds of game play illustrated in the figures that follow.

FIG. 6 depicts four members of target linked numerical image set TLNI6, each derived from germinal numerical image GNI6 (see FIG. 4) by the operation of subdivision transforms, and further assigned to be matchup target numerical images (MTNI).

FIG. 7 depicts four members of comparison linked numerical image set CLNI1, each derived from germinal numerical image GNI1 by the operation of a subdivision transform.

FIGS. 8-12 depict examples of one or more round of game play according to the method of the present invention, based upon germinal numerical images GNI1 and GNI6, wherein calculation of numerical similarities is further based upon assigned matchup target numerical images (MTNI) and chosen (and optionally qualified) matchup comparison numerical images (MCNI) using mean color overlap, wherein numerical scores are the sum of numerical similarity values of matchups made.

FIG. 13 depicts an example of a round of game play according to the method of the present invention, based upon germinal numerical images GNI1 and GNI6, wherein calculation of numerical similarities is based upon edge ratio overlap and numerical scores are the sum of numerical similarity values of matchups made. This figure illustrates that numerical similarities may be calculated by a variety of means (e.g., algorithms) so long as the calculation provides some rational basis for comparing numerical images.

FIG. 14 depicts viewable images for four comparison linked numerical image sets CLNI1-4, each derived from one of germinal numerical images GNI1, GNI2, GNI3, and GNI4.

FIG. 15 represents an excerpt from a round of game play in progress or just finished, dependent on game design and player choice, wherein members of comparison linked numerical image sets derived from germinal numerical images GNI1-4 have been chosen to be matchup CNI (MCNI) and are matched with members of a target linked numerical image set, derived from GNI6, that have been assigned to be matchup TNI (MTNI).

FIG. 16 is a tabulation of numerical similarities calculated, using mean color overlap, for all matchups contemplated during selection of the matchup comparison numerical images (MCNI) and matchup target numerical images (MTNI) used in FIG. 15 game play.

FIG. 17 represents an excerpt from a round of game play in progress or just finished, dependent on game design and player choice, wherein members of comparison linked numerical image sets derived from germinal numerical images GNI1-4 are matched differently with members of a target linked numerical image set derived from GNI6 than had been done in the round of game play represented in FIG. 15, with the result that a superior numerical score is achieved. Both FIG. 15 and FIG. 17 numerical scores are calculated using the same mean color overlap based method.

FIG. 18 is a tabulation of numerical similarities calculated, using mean color overlap, for all matchups contemplated during selection of the matchup comparison numerical images (MCNI) and matchup target numerical images (MTNI) used in FIG. 17 game play.

DETAILED DESCRIPTION

Figure 1:
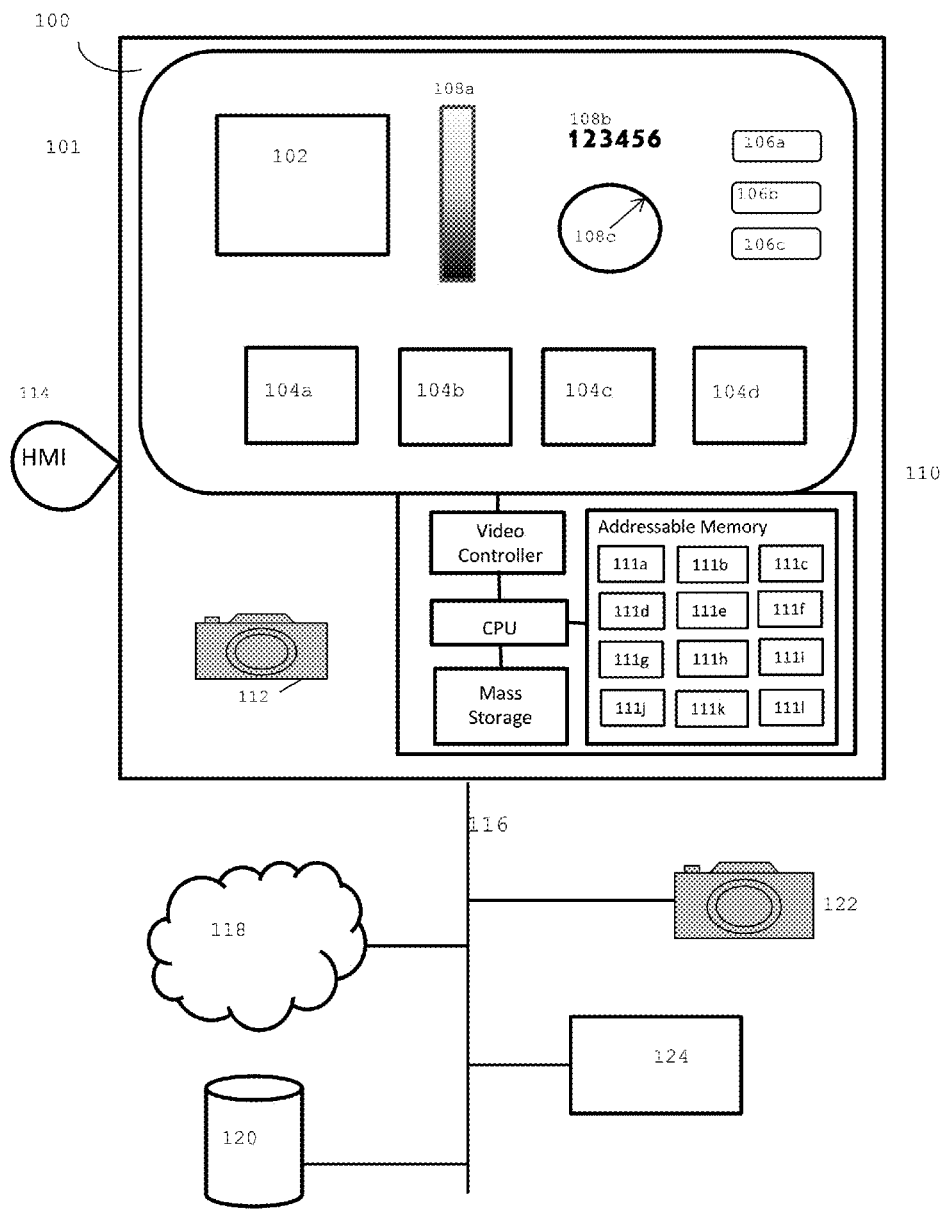
FIG. 1 is a simplified schematic representation of exemplary necessary and optional hardware and software components supporting execution of the method of the present invention.

FIG. 1 provides a simplified schematic representation of an electronic game device providing necessary and optional hardware components suitable for carrying out the steps of the method of the present invention, along with a number of exemplary game play elements including 100 an electronic gaming device console, known examples of which include, but are not limited to, a personal computer, a laptop computer, a mainframe computer, a gaming console such as a Microsoft Xbox One or Sony Playstation 4, a handheld gaming device, a cellular phone, or a tablet computer. Internal or external display hardware 101 includes, but is not limited to, a computer monitor, TV screen, or cell phone display. Displayed on the display hardware 101 are: a linked viewable image 102 representing a matchup target numerical image; linked viewable images 104a through 104d representing matchup comparison numerical images; and clickable or otherwise selectable elements 106a through 106c of a graphic user interface, the selectable elements including but not limited to buttons, checkboxes, radio buttons, menus, list boxes and combo boxes allowing the selection of game play options and constraints. Graphic user interface elements 108a through 108c indicating game progress include, but not limited to, a progress bar 108a, a text label 108b displaying the current score and a dial or meter type indicator 108c.

Game device electronic circuitry 110 suitable for execution of the game program includes a central processor unit (CPU), a video controller, random access memory (RAM), and mass storage which may include a hard disk drive, a floppy drive, memory stick or other solid state storage medium, a tape drive or any other device and medium suitable for the storage of digital data and programs which include, but not limited to, the operating system, numerical images and computer programs. Included in non-transitory computer-readable storage medium (shown as addressable memory) is a system for image construction formulated as a game including: a germinal numerical image library provision component 111a for providing a germinal numerical image library; a numerical image transformation component 111b for transforming one numerical image into another numerical image; a target LNI set construction component 111c for constructing a target linked numerical image set; a comparison LNI set construction component 111d for constructing a comparison linked numerical image set; a target LNI assignment component 111e for assigning one or more target linked numerical image to be a matchup target numerical image; a comparison LNI choice component 111f for choosing a comparison linked numerical image to be a matchup comparison numerical image; a matchup numerical image comparing component 111g for comparing one or more matchup comparison numerical image with one or more matchup target numerical image, wherein the matchup numerical image comparison component further includes a target numerical descriptor calculation component, a comparison numerical descriptor calculation component, and a numerical similarity calculation component; and a numerical score calculation component 111h for calculating a numerical score. The system of FIG. 1 further includes a rendering component 111i for rendering a color numerical image to form a viewable image; a comparison LNI qualification component 111j for qualifying a comparison linked numerical image to be a matchup comparison numerical image; a graphical user interface 111k for facilitating communication between computer hardware and software and a player; and a game play option recorder 111l for recording game play options.

A digital camera 112 may be internal or external to the electronic gaming device. One or more Human Machine Interface (HMI) devices 114 may non-exhaustively include: a computer mouse, joystick, trackball, hand held game controller, eye tracking device, body motion track device, or touch screen. One or more computer networks 116 connect the electronic gaming device to external devices. The network may be a hardwired network, optical network, or wireless network including, but not limited to, radio frequency or cellular networks. One or more cloud storage systems 118 may be hosted by a game player or other third party supplier and accessible by computer network 116. One or more databases 120 include, but are not limited to, Microsoft SQL Server, Oracle, My SQL. One or more networked digital cameras 122 are capable of capturing and storing numerical images that may be retrieved through network 116. One or more other electronic gaming devices 124 are, optionally, connected to the networks.

Figure 2A:
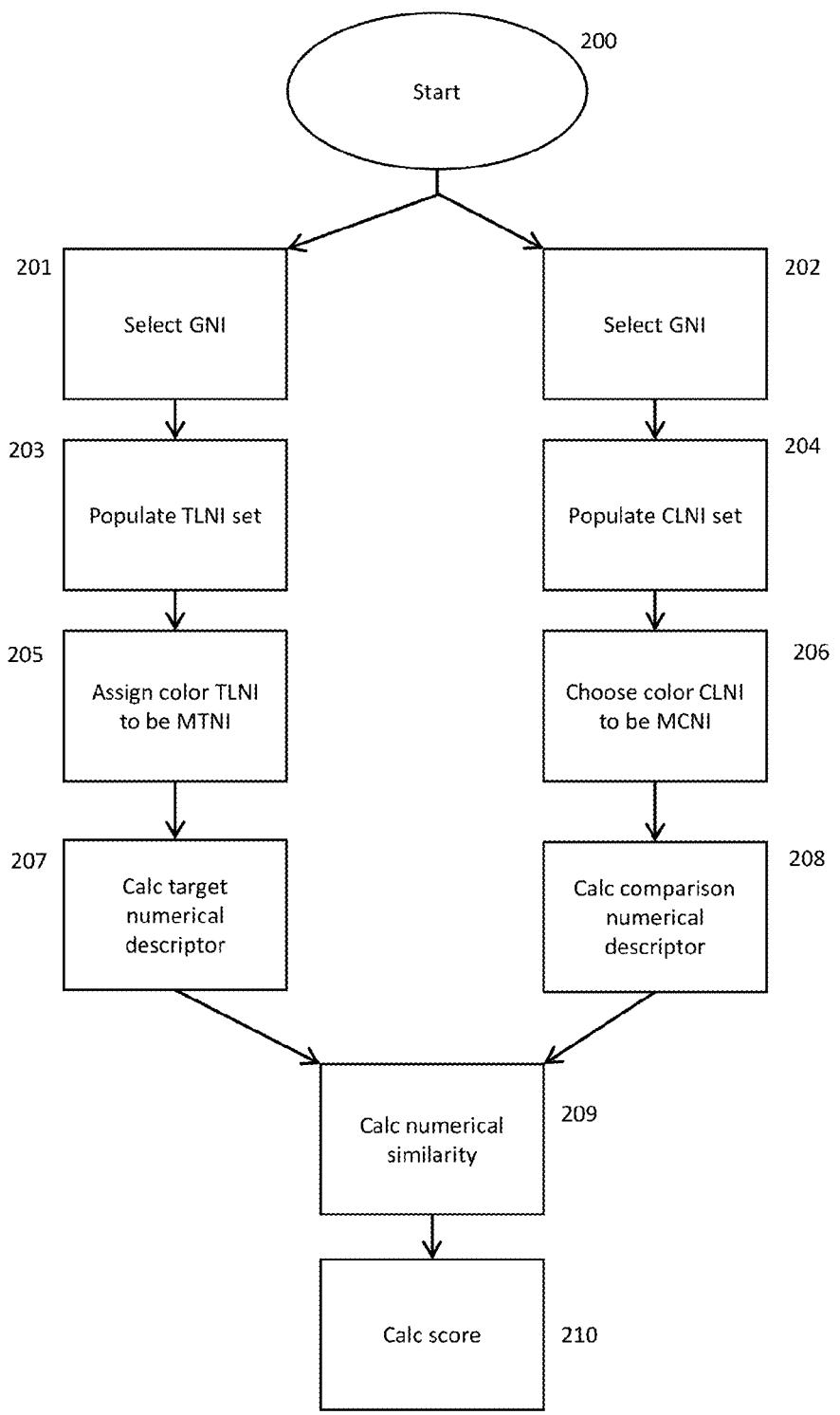
FIG. 2A is a flow diagram depicting the conduct of game play according to the method of the present invention.

FIG. 2A is a flow diagram depicting the conduct of game play according to the method of the present invention. At the start 200 of game play, and as part of a step of constructing a target linked numerical image set (TLNI), selecting (201) a germinal numerical image (GNI) occurs according to game design or player choice to originate populating (203) of a TLNI set. Populating (203) the TLNI set forms member target linked numerical images, at least one of which is a color numerical image. The step of assigning (205) a color TLNI to be a matchup target numerical image (MTNI) identifies at least one member of the TLNI set for use calculating (207) a target numerical descriptor. In like manner, the step of selecting (202) a germinal numerical image (GNI) to originate populating (204) of a CLNI set, precedes the populating (204) of the CLNI set to form member comparison linked numerical images (CLNI), at least one of which is a color numerical image. The step of choosing (206) a color CLNI to be a matchup comparison numerical image (MCNI) identifies at least one member of the CLNI to be used for calculating (208) a comparison numerical descriptor. In a step of comparing one or more MCNI with one or more MTNI, the calculating 207 and the calculating 208 result, respectively, in target and comparison numerical descriptors upon which the calculating (209) of a numerical similarity is based. The calculating (210) of a numerical score is based upon one or more numerical similarity.

Figure 2B:
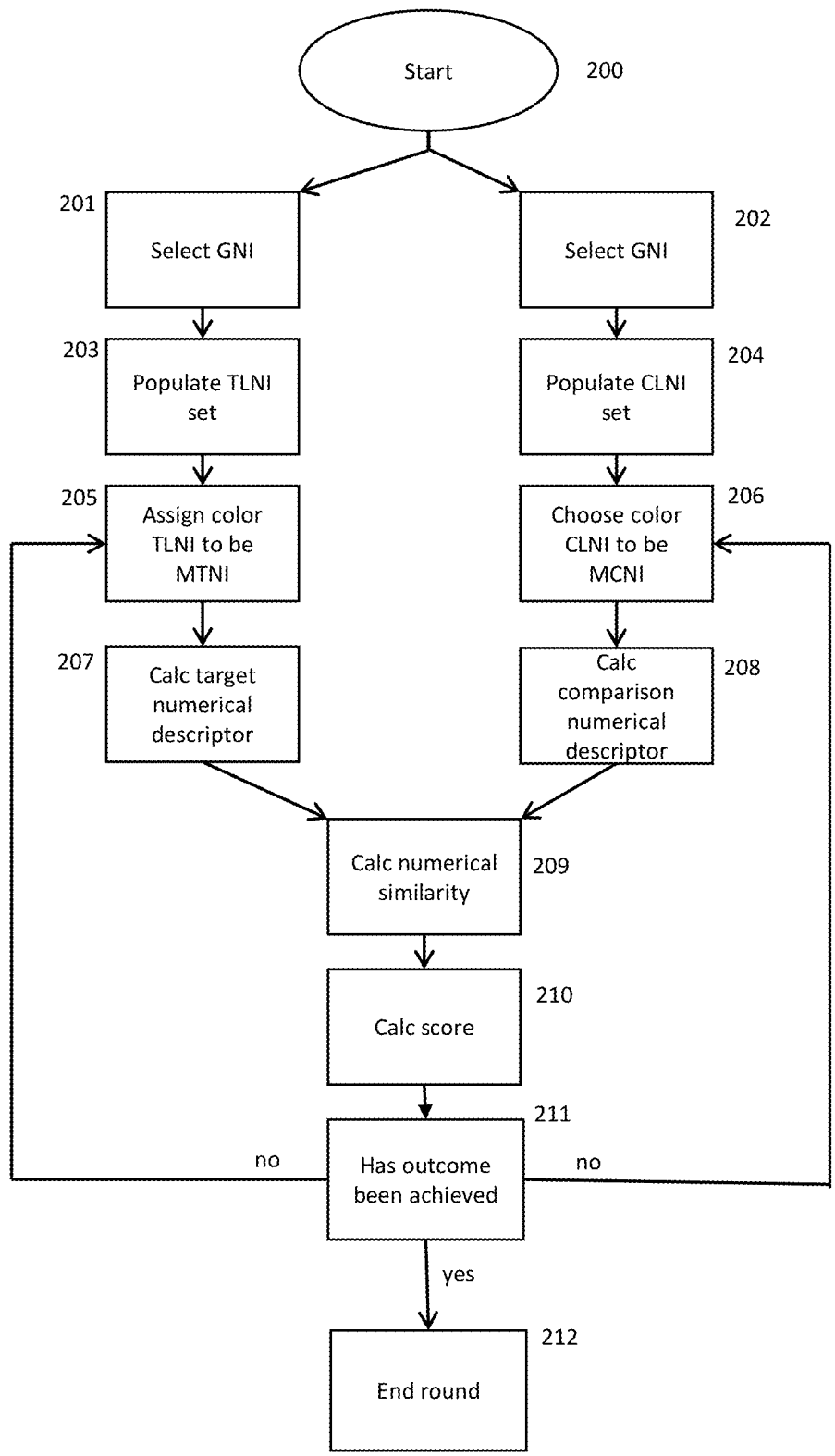
FIG. 2B is the flow diagram of FIG. 2A further depicting repetition of steps until an outcome is achieved, ending a round of game play.

FIG. 2B depicts the playing of a round of game play in which the round is played until it is determined that a specified outcome has been achieved (211). Achievement of the specified outcome signals the ending of the round (212). Until that determination is made, the round continues, in this case, by: assigning more color TLNI to be MTNI; choosing more color CLNI to be MCNI; calculating additional target and comparison numerical descriptors; calculating additional scores; and again determining whether an outcome has been achieved (211). Illustrative alternative options for continuing a round include further populating any of the TLNI sets or CLNI sets (203 and 204, respectively) and repeating intervening steps from that populating to the determining of outcome (211) until the specified outcome has been achieved. Another illustrative alternative option for continuing a round includes selecting one or more additional GNI from the provided GNI library, and constructing an additional TLNI set, an additional CLNI set, or both, and proceeding through the intervening steps from that selecting to the determining of outcome (211) until the specified outcome has been achieved.

Figure 2C:
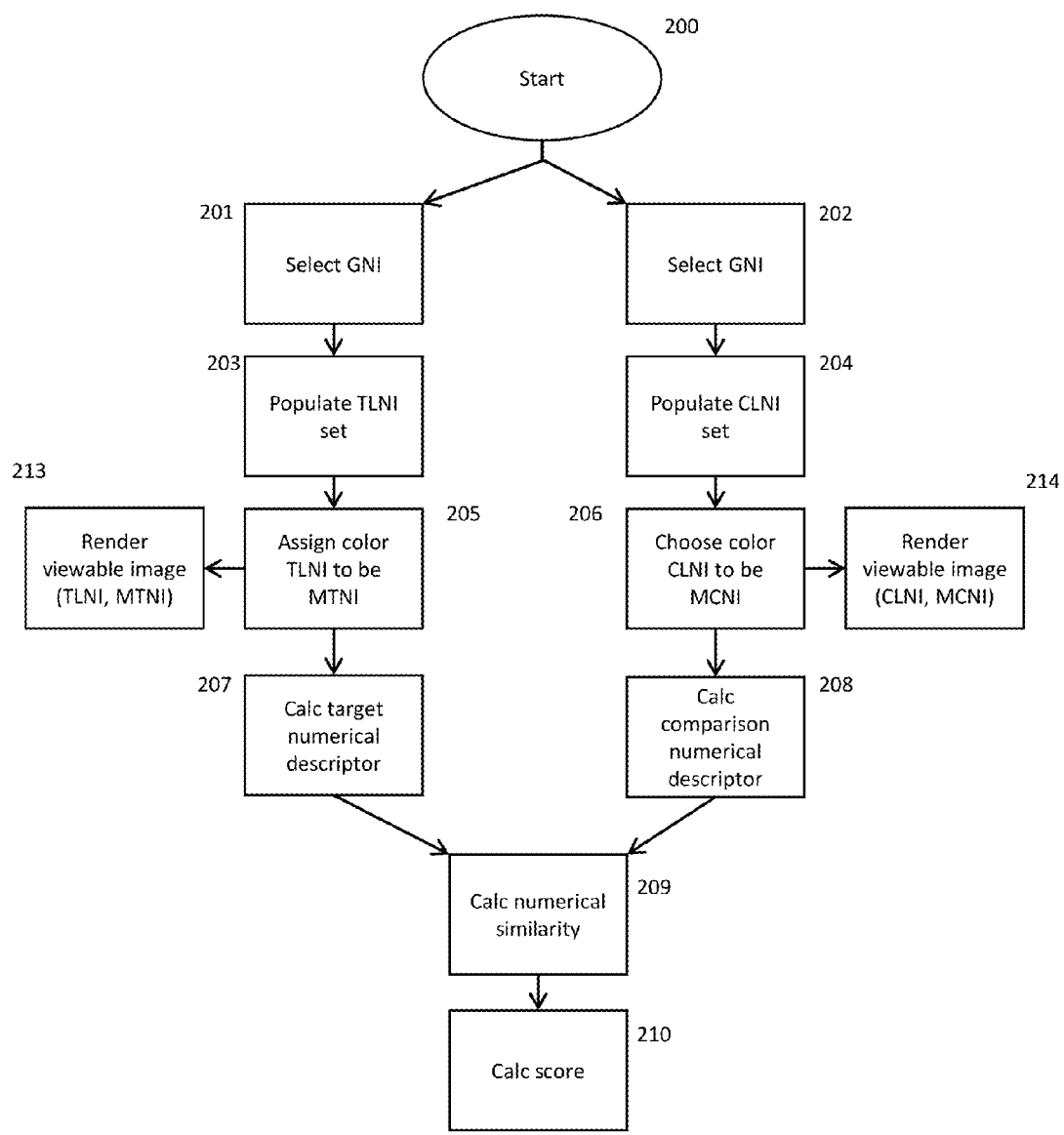
FIG. 2C is the flow diagram of FIG. 2A further depicting the rendering of viewable images during the steps of assigning color target linked numerical images (TLNI) to be matchup target numerical images (MTNI) and choosing color comparison linked numerical images (CLNI) to be matchup comparison numerical images (MCNI).

FIG. 2C depicts the conduct of the method of game play of FIG. 2A illustration, and further adds: the rendering (213) to viewable images of one or more of the color target linked numerical images and matchup target numerical images: and the rendering (214) to viewable images of one or more of the color comparison linked numerical images and matchup comparison numerical images. The viewable images (interchangeably, linked viewable images, in that each is linked to a color numerical image) are available to sighted players as tangible representations of the color numerical images to which they are linked. The rendering (213 and 214) of a color numerical image to form a viewable image further induces a tangible condition or state in rendering device hardware (e.g., pixels having various color intensities), providing the viewable image for observation by a player. As such, the condition or state induced in rendering device hardware to produce a viewable image, and the viewable image itself, are each tangible representations of the color numerical image to which the viewable image is linked. Although FIG. 2C depicts rendering of at least one target type numerical image and at least one comparison type numerical image to form linked viewable images, the method of the present invention contemplates embodiments in which a single, a few, or many color NI are rendered to form viewable images. Even embodiments in which no color NI is rendered, that is no viewable image is formed, are contemplated. Dependent upon game design and viewable image constraints, any color numerical image that is a GNI, a TLNI, a CLNI, an MTNI, a potential MCNI, or an MCNI may be rendered to form a viewable image that is linked to that color NI through rendering accomplished by a rendering device.

Figure 2D:
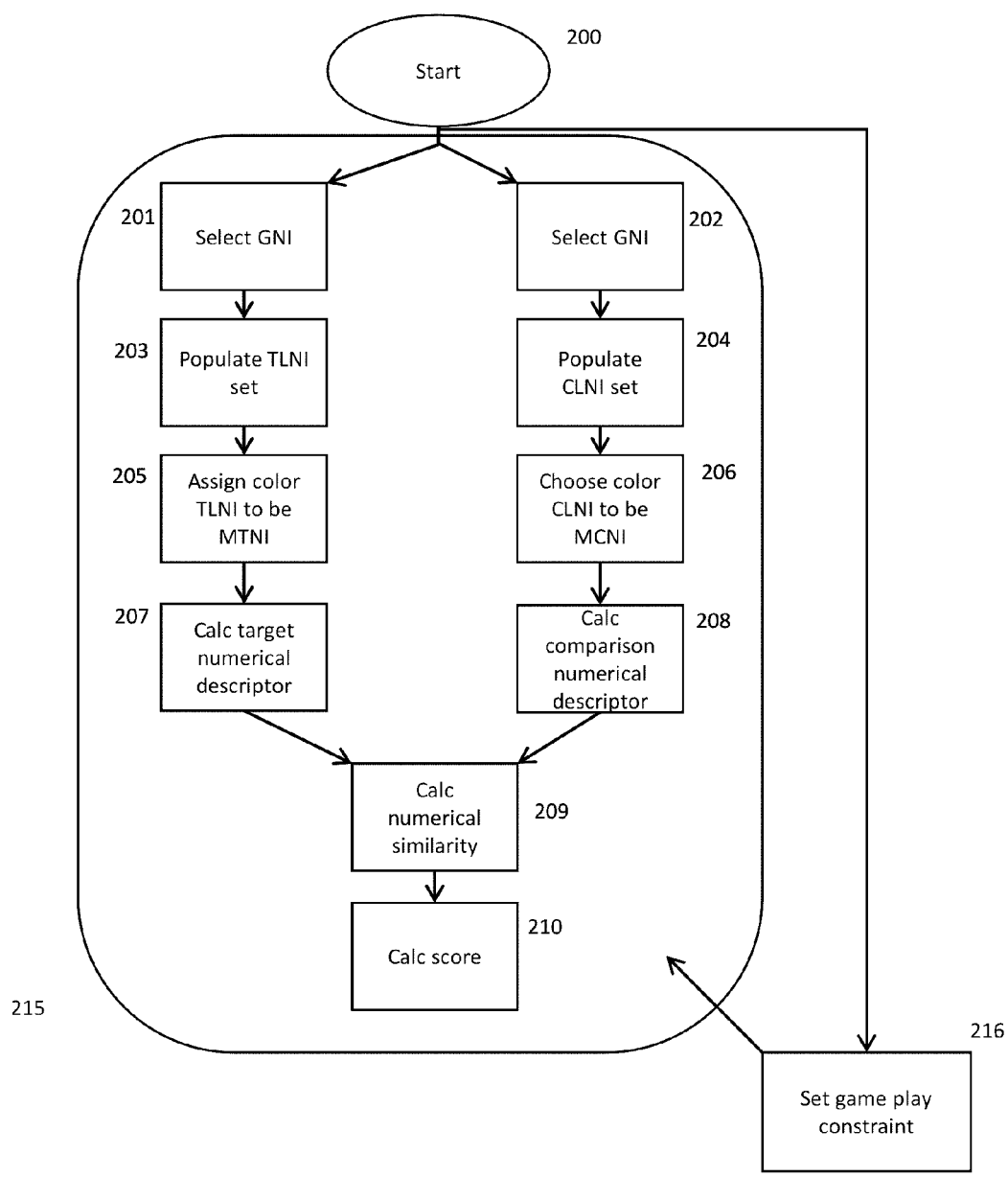
FIG. 2D is the flow diagram of FIG. 2A further depicting the setting of game play constraints at one or more points prior to or during one or more steps.

FIG. 2D illustrates that the conduct of game play of the FIG. 2A illustration may, optionally, include the setting (216) a game play constraint. That setting of a game play constraint may occur at any point in the method (215), so long as that point precedes any step, or portion of any step being constrained such that the full effect of the constraint can be exerted.

Figure 2E:
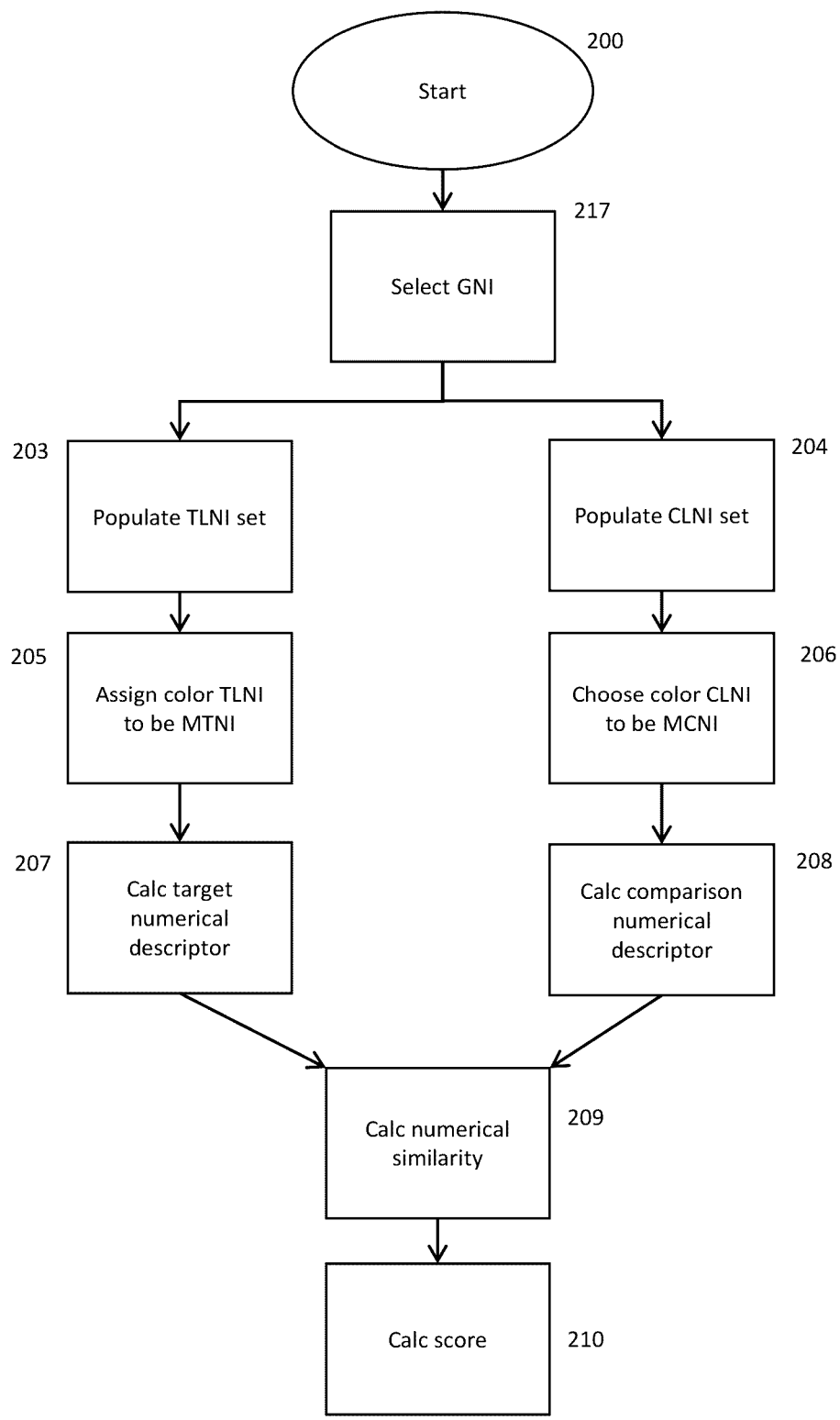
FIG. 2E depicts the conduct of game play of the FIG. 2A illustration wherein the same selected germinal numerical image serves to originate members of both a target linked numerical image set and a comparison linked numerical image set.

FIG. 2E depicts the conduct of game play of the FIG. 2A illustration wherein the same selected (217) germinal numerical image serves to originate members of both a target linked numerical image set (203) and a comparison linked numerical image set (204). This multi-purposing of a single GNI is simply a special case of the FIG. 2A method, shown here to emphasize that, although there may be many ways to describe how the method of the present invention provides GNI and forms TLNI and CLNI from those GNI, the FIG. 2A method includes cases in which the one or more GNI from which TLNI are derived are different or the same as the one or more GNI from which CLNI are derived. Hence, the selecting (217) of GNI of this figure and the selecting of GNI (201 and 202) of FIG. 2A are really the same, with the former being a special case of the latter. Further, the formation of a linked numerical image (LNI) prior to its designation as either a target LNI or a comparison LNI is simply considered to be part of the process of populating the TLNI set (203) or the CLNI set (204), and not some additional or separate step.

Figure 3:
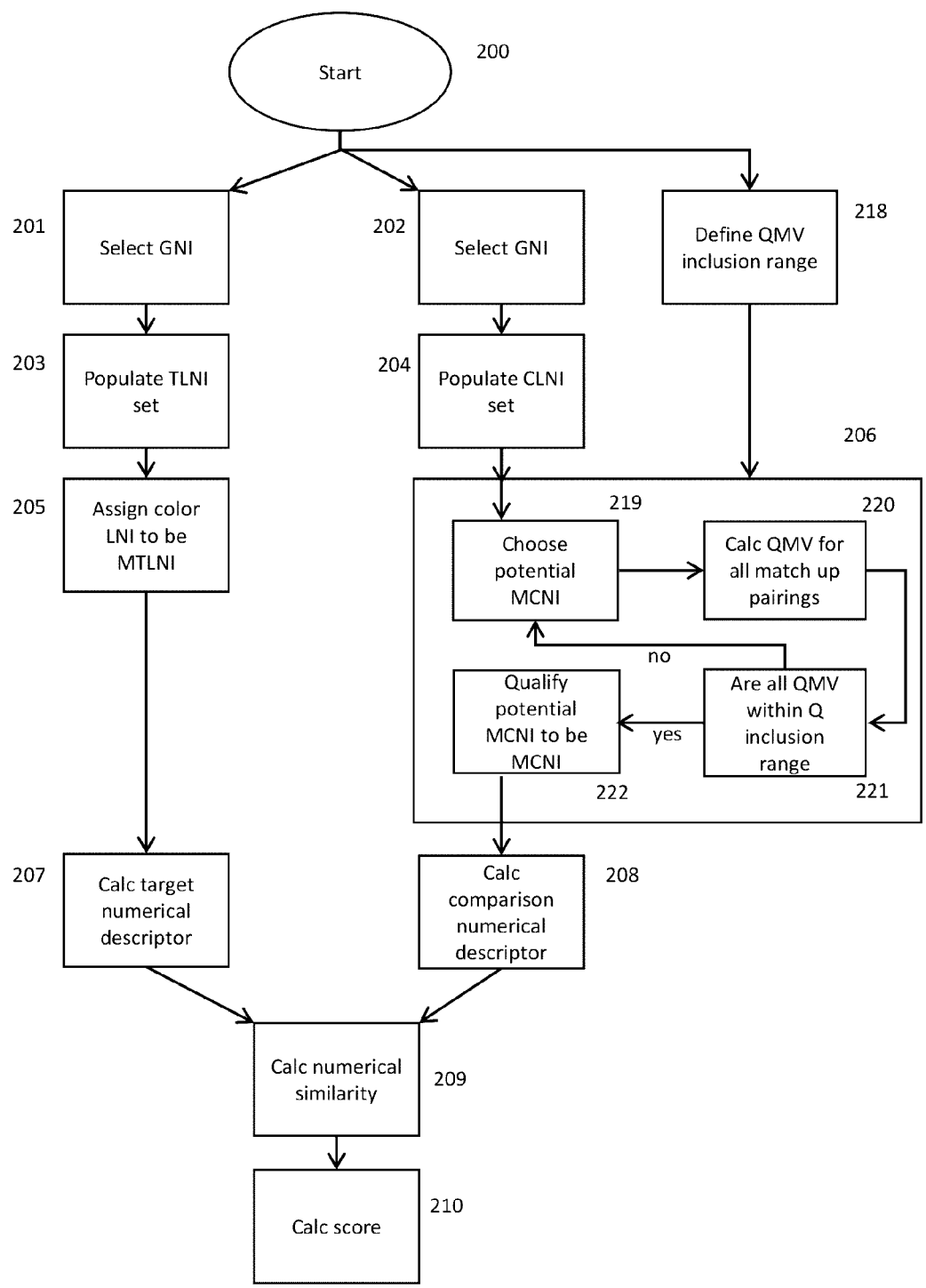
FIG. 3 depicts the introduction of a matchup comparison image constraint to the method of the present invention.

FIG. 3 depicts the introduction of a matchup comparison numerical image constraint to the method of FIG. 2A. This matchup CNI constraint is applied to the step of choosing (206) color CLNI to be MCNI, and includes the further steps of: defining (218) a qualifying metric value (QMV) inclusion range, wherein the QMV inclusion range contains less than all possible qualifying metric values; designating each chosen comparison linked numerical image to be a potential matchup CNI (i.e., choosing, 219, potential MCNI); for each potential matchup CNI, calculating a qualifying metric value for each matchup pairing (220); and determining whether all matchup pairings have a qualifying metric value, QMV, within the QMV inclusion range (221). Upon determining that all possible matchup pairings have a qualifying metric value within the QMV inclusion range, the potential matchup CNI is qualified (222) to be a matchup comparison numerical image. Alternatively, upon determining that at least one matchup pairing has a qualifying metric value that falls outside of the QMV inclusion range, the potential matchup CNI is disqualified from becoming a matchup comparison numerical image, relative to the matchup target numerical images at issue, and additional potential MCNI are evaluated (219/220/221).

Figure 4:
Figure 4:
Figure 4:
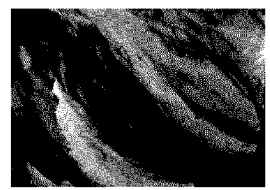
Figure 4:
Figure 4:
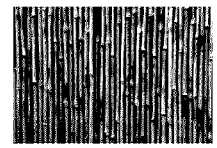
Figure 4:

FIG. 4 depicts members of a germinal numerical image library. The six germinal numerical images, each a 32 bit color numerical image, would typically be rendered as 32 bit color viewable images, but are rendered for the present patent document as grayscale viewable images. Here, each of the four germinal numerical images GNI1 through GNI4 has been selected to originate a comparison linked numerical image set, respectively sets CLNI1 through CLNI4 (see subsequent figures). GNI6 has been selected to originate both a comparison LNI set, CLNI6, and a target LNI set, TLNI6. GNI5, though available to originate a linked numerical image set, is not selected to do so in the rounds of game play of subsequent FIGS. 5-18. The present invention envisions that the GNI library of which GNI1-6 are members might contain only the six GNI depicted in FIG. 4, or could contain billions of GNI without any particular limit, or any intermediate number of GNI. The GNI library could further reside on a single computer device of be distributed among any number of computer devices.

Figure 5A:
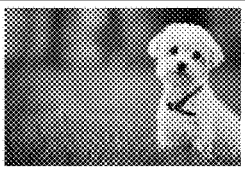
FIG. 5A depicts viewable images (VI) representative of members of linked numerical image (LNI) sets derived from each of the FIG. 4 originating germinal numerical images.
Figure 5A:
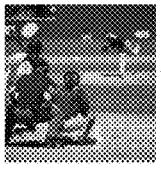
Figure 5A:
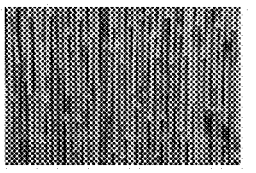
Figure 5A:
Figure 5A:
Figure 5A:
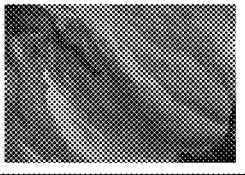
Figure 5A:
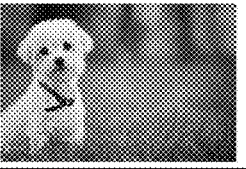
Figure 5A:
Figure 5A:
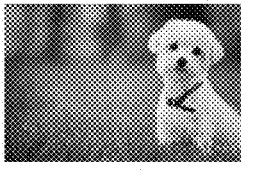

FIG. 5A depicts viewable images representative of members of linked numerical image sets derived from each of the FIG. 4 germinal NI. Therefore, CLNI1a (baseball players) is a member of set CLNI1. Linked comparison numerical image CLNI1a happens to be identical to the germinal numerical image, GNI1, from which it was derived, and is therefore formed by the operation of an identity transform. In like manner, comparison numerical images CLNI2a through CLNI5a are identical, respectively, to GNI2 through GNI5 from which they were derived. Comparison numerical images CLNI6a, b, and c are all members of the same set CLNI6 derived from germinal numerical image GNI6. CLNI6a was derived from GNI6 by operation of a geometrical transform that is a subdivision transform; CLNI6b was derived from GNI6 by operation of a geometrical transform that is a vertical flipping transform; and CLNI6c is derived from GNI6 by operation of an identity transform, and is therefore identical to GNI6. Target linked numerical image TLNI6a was derived from GNI6 by operation of an identity transform and is therefore identical to GNI6. Here, GNI6 was used to originate both a comparison LNI set and a target LNI set. Those two sets derived from GNI6 could be identical in number of members and content, or different. Any of sets CLNI1 through CLNI5 and set TLNI6 could have the single member depicted as its viewable image in FIG. 5A, or could include many members, without any particular limitation. Set CLNI6 could have the three members depicted, or could include many members, without any particular limitation.

Figure 5B:
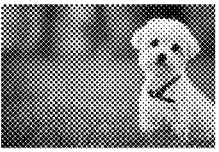
FIG. 5B depicts use of the Specific Qualifying Algorithm (SQ Algorithm) in a qualifying step applied as a matchup comparison image (MCI) constraint during the step of choosing a comparison linked numerical image (CLNI) to be a potential matchup comparison numerical image (PMCNI).
Figure 5B:
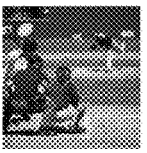
Figure 5B:
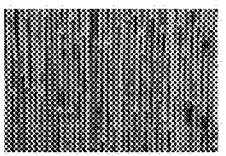
Figure 5B:
Figure 5B:
Figure 5B:
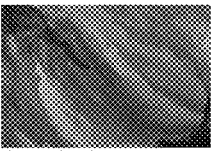
Figure 5B:
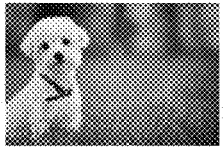
Figure 5B:
Figure 5B:
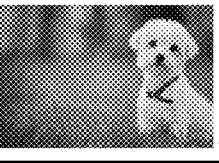

FIG. 5B depicts use of the Specific Qualifying Algorithm (SQ Algorithm) in a qualifying step applied as a matchup comparison image constraint during the step of choosing a comparison linked numerical image to be a potential matchup comparison numerical image (PMCNI). As the names imply, the Specific Qualifying Algorithm, the Specific Qualifying Metric Value, and the SQMV inclusion range are, respectively, specific cases of the Q algorithm, the QMV, and the QMV inclusion range of FIG. 3. In this case, a specific qualifying metric value (SQMV) is calculated using the SQ Algorithm for each chosen potential matchup comparison numerical image (PMCNI1a-5a and PMCNI6a-c) paired singly with the single matchup target numerical image MTNI6a (from the assigning of TLNI6a to be a matchup TNI). In an illustrative example, the SQ Algorithm is applied to the matchup pairing of PMCNI1a with MTNI6a to calculate an SQMV of 0.656. In another example, the SQ Algorithm is applied to the matchup pairing of PMCNI6c with MTNI6a, resulting in an SQMV=1.0, indicating that the two numerical images of that matchup pairing are identical, a result that is consistent with their having been derived from the same germinal numerical image, GNI6, each through the operation of an identity transform. If an SQMV inclusion range spanning at least zero to no more than 0.6 were defined in the qualifying step and each of the potential matchup CNI of FIG. 5B were qualified solely by referencing MTNI6a, the potential matchup CNI that would qualify to be matchup CNI would be: PMCNI2a, PMCNI3a, and PMCNI5a. If, on the other hand, an SQMV inclusion range spanning at least zero to no more than 0.995 were defined in the qualifying step, all of the potential matchup CNI of FIG. 5B would qualify except for PMCNI6b and PMCNI6c, so that only the PMCNI identical to, or nearly identical to the matchup target numerical imager, MTNI6a would be excluded from qualification to be matchup CNI.

Figure 6:
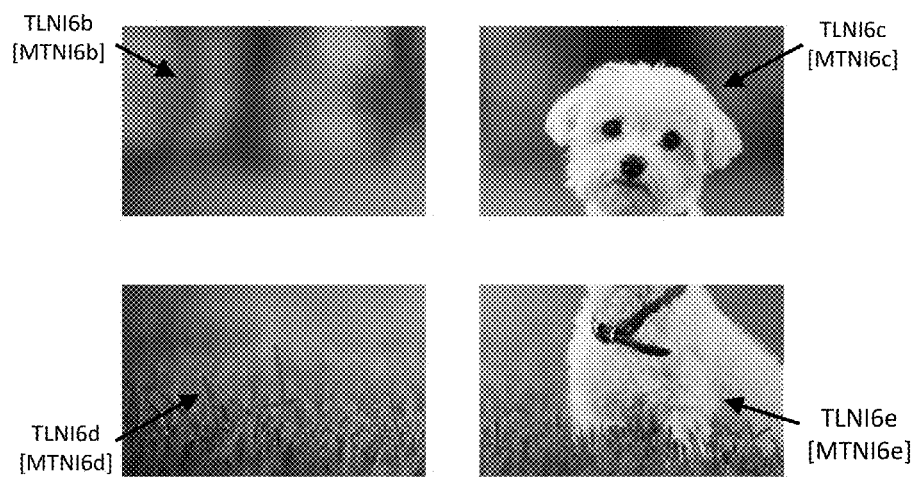

FIG. 6 depicts four members of target linked numerical image set TLNI6, each derived from germinal numerical image GNI6 by the operation of a subdivision transform. These four members are designated TLNI6b, TLNI6c, TLNI6d, and TLNI6e. If any of these members were assigned to be a matchup target numerical image to be referenced in the step of comparing a matchup comparison numerical image with a matchup target numerical image, that member would further be labeled as a matchup target numerical image. In that way, TLNI6b, TLNI6c, TLNI6d, and TLNI6e would further be labeled, respectively, as MTNI6b, MTNI6c, MTNI6d, and MTNI6e (shown in brackets).

Figure 7:
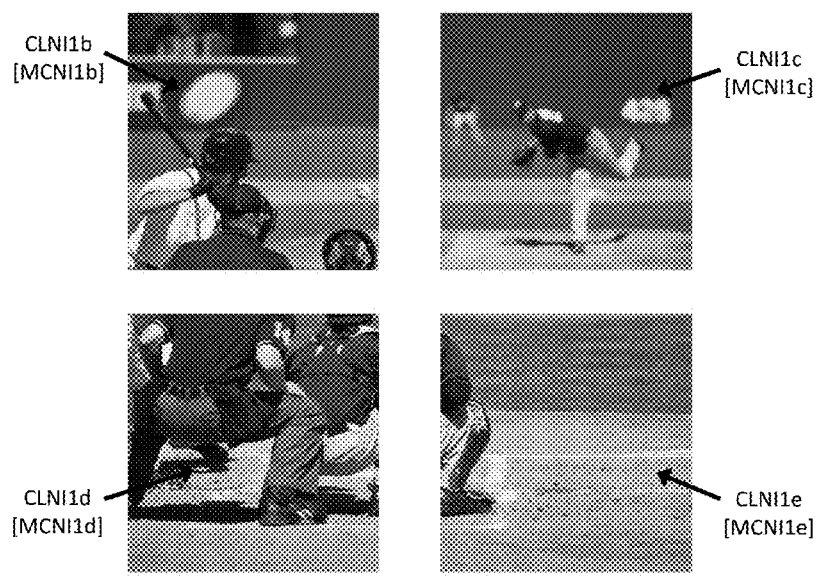

FIG. 7 depicts four members of comparison linked numerical image set CLNI1, each derived from germinal numerical image GNI1 by the operation of a subdivision transform. These four members are designated CLNI1b, CLNI1c, CLNI1d, and CLNI1e. If any of these members were chosen (and qualified, when qualifying is, optionally, required) to be a matchup comparison numerical image to be referenced in the step of comparing a matchup comparison numerical image with a matchup target numerical image, that member would further be designated as a matchup comparison numerical image. In that way, CLNI1b, CLNI1c, CLNI1d, and CLNI1e would further be designated, respectively, MCNI1b, MCNI1c, MCNI1d, and MCNI1e (shown in brackets).

Figure 8:
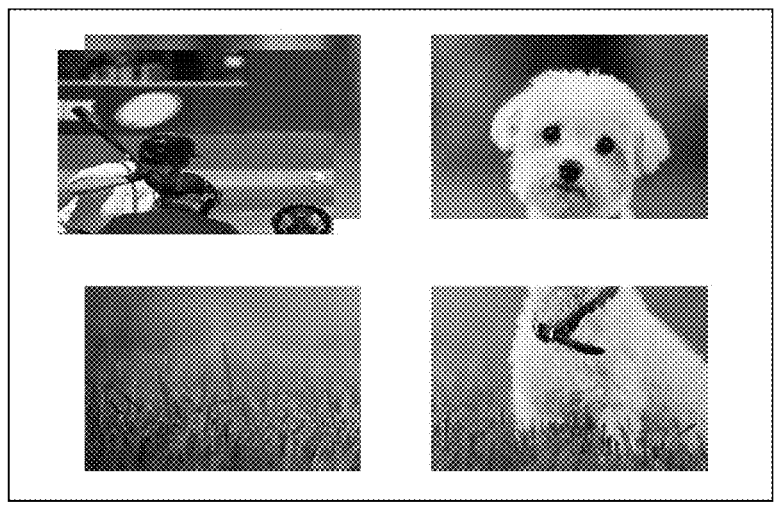

FIG. 8 represents an excerpt from a round of game play in progress or just finished, dependent on game design and player choice, including a diagrammatic representation of a portion of the display 801, wherein viewable images of MTNI6b, MTNI6c, MTNI6d, and MTNI6e are displayed with MCNI1b having been placed over the viewable image of MTNI6b, according to a player's directive (e.g., by swiping a touch screen), thereby designating MCNI1b to be the player's selection for comparison with MTNI6b. The computed numerical similarities for the 16 possible one-to-one combinations of the four matchup target NI (MTNI6b-e) of FIG. 6 and the four matchup comparison NI (MCNI1b-e) for FIG. 7 are tabulated in table 802. These numerical similarities were computed using only the mean color overlap (MCO) calculation described as a part of the SQ Algorithm (see the SQ Algorithm code preceding the examples). Here the MCO calculation is used independent of the SQ Algorithm and, as such, represents just one of the many ways a numerical similarity may be calculated, so long as that calculation provides some rational basis for comparing numerical images. The circled score of 0.460 is the numerical similarity for MCNI1b compared to MTNI6b. In this case, the numerical score 803 is the sum of the numerical similarities for those matchup CNI that have been compared with matchup TNI. Here, there has been a single matchup and this FIG. 8 game design specifies that the numerical score for this round of game play, or portion of a round, equals the sum of the numerical similarities for any matchups. Therefore, the numerical score for this point in the round is the same as the circles numerical similarity, 0.460.

Figure 9:
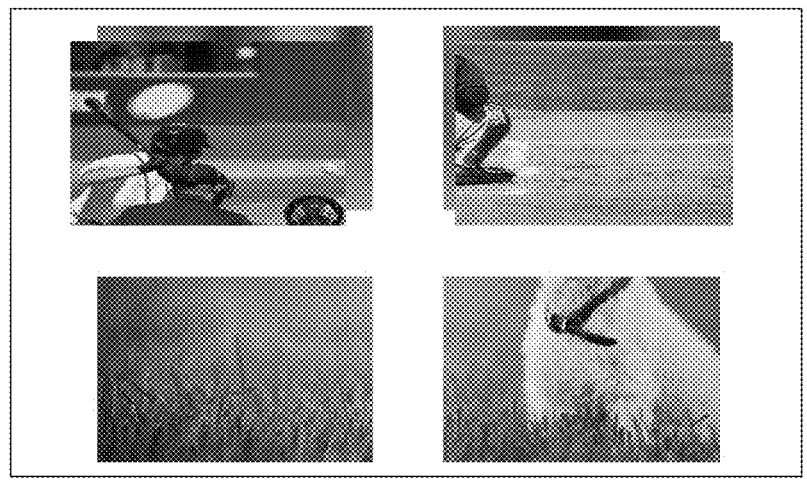

FIG. 9 represents an excerpt from a round of game play in progress or just finished, dependent on game design and player choice, including a diagrammatic representation of a portion of the display 901, wherein viewable images of MTNI6b, MTNI6c, MTNI6d, and MTNI6e are displayed with MCNI1b having been placed over the viewable image of MTNI6b according to a player's directive (e.g., by swiping a touch screen), thereby designating MCNI1b to be the player's selection for comparison with MTNI6b. Likewise, the viewable image for MCNI1e has been placed over the viewable image for MTNI6c. The computed numerical similarities for the 16 possible one-to-one combinations of the four matchup target NI (MTNI6b-e) of FIG. 6 and the four matchup comparison NI (MCNI1b-e) for FIG. 7 are tabulated in 902 and are the same as in FIG. 8. As in FIG. 8, the numerical similarities were computed using only the mean color overlap (MCO) described as a part of the SQMV computation, but independent of the SQ Algorithm. The circled values 0.460 and 0.401 are the numerical similarities for MCNI1b compared to MTNI6b, and for MCNI1e compared to MTNI6c, respectively. In this case, the numerical score 903 is the sum of the numerical similarities for both matchups. Here, there have been two matchups and this FIG. 9 game design specifies that the numerical score for this round of game play equals the sum of the numerical similarities for any matchups. Therefore, the numerical score for this round is the sum of the circled numerical similarities 0.460 and 0.401, equaling 0.861. Typically, numerical scores other than a final numerical score for a round of game play may be calculated if allowed by game design, e.g., to allow a player to monitor game play. In that way, intermediate numerical scores such as 0.460 and 0.401 for individual matchups might appear during a round of game play, along with a final score of 0.861.

Figure 10:
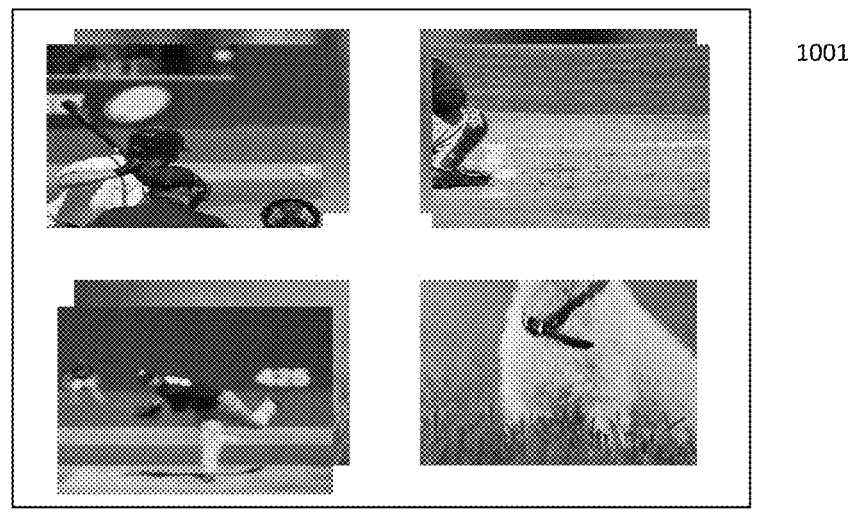

FIG. 10 represents an excerpt from a round of game play in progress or just finished, dependent on game design and player choice, including a diagrammatic representation of a portion of the display 1001, wherein viewable images of MTNI6b, MTNI6c, MTNI6d, and MTNI6e are displayed with viewable images of MCNI1b, MCNI1e, and MCNI1c having been placed over the viewable images of MTNI6b, c, and d, respectively. Table 1002 contains the same values for numerical similarities as did the tables of FIGS. 8 and 9, computed in the same way using the mean color overlap. The circled scores 0.460, 0.401, and 0.428 are the numerical similarities for MCNI1b compared to MTNI6b, for MCNI1e compared to MTNI6c, and for MCNI1c compared to MTNI6d, respectively. In this case, the numerical score 1003 is the sum of the numerical similarities for three matchups. Here, there have been three matchups and this FIG. 10 game design specifies that a numerical score for this round of game play equals the sum of the numerical similarities for any matchups. Therefore, a numerical score for this round is the sum of the circled numerical similarities 0.460, 0.401, and 0.428, equaling 01.289. Intermediate numerical scores such as 0.460, 0.401, 0.428, 0.861, 0.829, and 0.888 for individual matchups and combinations of less than all matchups might appear on display 1001 during a round of game play, along with a total numerical score of 1.289.

Figure 11:
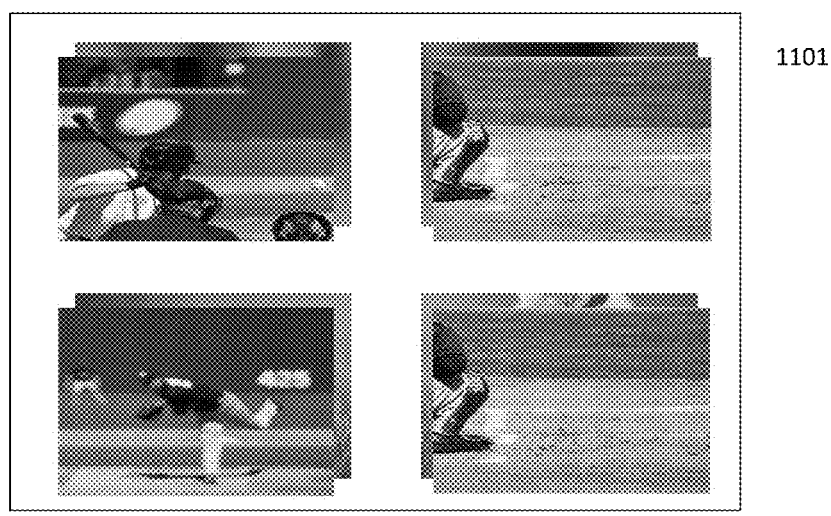

FIG. 11 represents an excerpt from a round of game play in progress or just finished, dependent on game design and player choice, including a diagrammatic representation of a portion of the display 1101, wherein viewable images of MTNI6b, MTNI6c, MTNI6d, and MTNI6e are displayed with viewable images of MCNI1b, MCNI1e, MCNI1c, and MCNI1e having been placed over the viewable images of MTNI6b, c, d, and e respectively. Table 1102 contains the same values as did the tables of FIGS. 8, 9, and 10 computed in the same way using the mean color overlap. The circled scores 0.460, 0.401, 0.428, and 0.549 are the numerical similarities for MCNI1b compared to MTNI6b, for MCNI1e compared to MTNI6c, for MCNI1c compared to MTNI6d, and for MCNI1e compared to MTNI6e, respectively. In this case, the numerical score 1103 is the sum of the numerical similarities for four matchups. Here, there have been four matchups and this FIG. 11 game design specifies that a numerical score for this round of game play equals the sum of the numerical similarities for any matchups. Therefore, a numerical score for this round is the sum of the circled numerical similarities 0.460, 0.401, 0.428, and 0.549, equaling 01.838. Intermediate numerical scores such as 0.460, 0.401, 0.428, 0.549, 0.861, 0.820, 0.888, 1.009, 1.289, and 1.411 for individual matchups and combinations of less than all matchups might appear during a round of game play, along with a final score of 1.838. Here, one of the matchup CNI, MCNI1e, is used twice, once with for comparing with MTNI6c and once with MTNI6e. This multiple use of an MCNI illustrates a case in which game play design, perhaps coupled with player choice, allowed or required an MCNI to be used twice. This multiple use of an MCNI might, for example, result from there being no constraint on the number of times an MCNI can be used, or from a game play constraint stipulating that at least one of the MCNI be used twice. The FIG. 11 round of game play depicted here may be due, for example, to a constraint that, once all MTNI have been matched, the round is over. Alternatively, there may be no such constraint, and it may be possible that a player may be able to replace the MCNI of a particular match with another MCNI (e.g., to improve the numerical score). In the later case, the game play continues within the round. In the former case, the round is complete, such that the possibility of playing a subsequent round, as well as the character of that round (e.g., constraint change, no constraint change, germinal NI change, no GNI change), will be a matter of game design and player choice.

Figure 12:
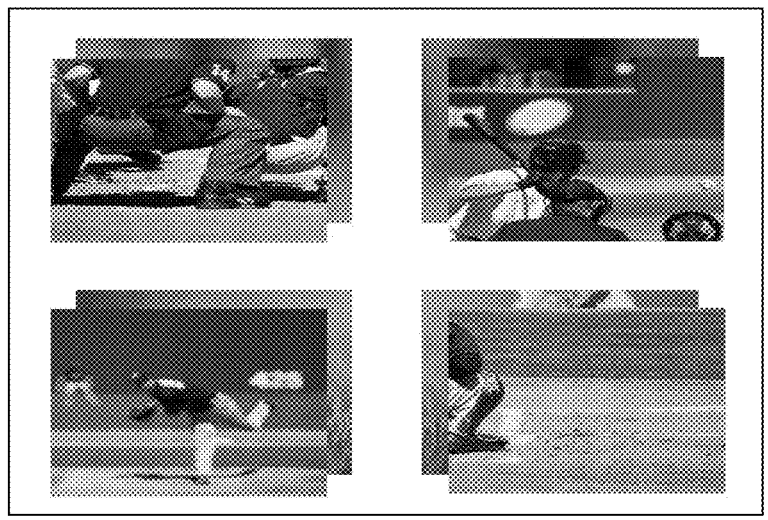

FIG. 12 represents an excerpt from a round of game play in progress or just finished, dependent on game design and player choice, including a diagrammatic representation of a portion of the display 1201, wherein viewable images of MTNI6b, MTNI6c, MTNI6d, and MTNI6e are displayed with viewable images of MCNI1d, MCNI1b, MCNI1c, and MCNI1e having been placed over the viewable images of MTNI6b, c, d, and e respectively. Table 1202 contains the same values as did the tables of FIGS. 8, 9, 10, and 11 computed in the same way using the mean color overlap. The circled scores 0.243, 0.308, 0.428, and 0.549 are the numerical similarities for the combinations used in the matchups. In this case, the numerical score 1203 is the sum of the numerical similarities for four matchups. Here, there have been four matchups and this FIG. 12 game design specifies that a numerical score for this round of game play equals the sum of the numerical similarities for any matchups. Further, a combination of game design and player choice has set a constraint that no MCNI may be used in more than one match. Of course, these same matchups might have occurred had there been no such constraint and no constrain that at least one of the MCNI1 set members be used more than once. The player may simply have decided to use every available MCNI. In this FIG. 12 case, the combination of game design and player choice has led to a lower total numerical score that was calculated for the combination of game design and player choice depicted in FIG. 11.

Figure 13:
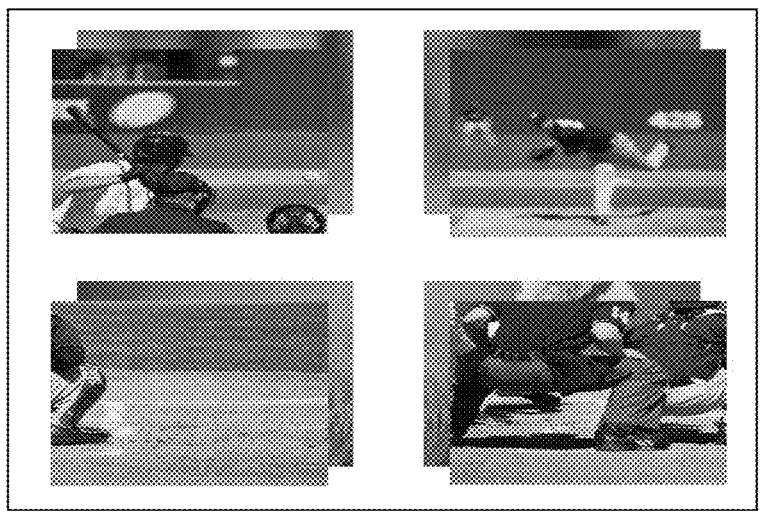

FIG. 13 represents an excerpt from a round of game play in progress or just finished, dependent on game design and player choice, including a diagrammatic representation of a portion of the display 1301, wherein viewable images of MTNI6b, MTNI6c, MTNI6d, and MTNI6e are displayed with viewable images of MCNI1b, MCNI1c, MCNI1e, and MCNI1d having been placed over the viewable images of MTNI6b, c, d, and e respectively. Table 1302 contains the values for numerical similarities for the 16 possible one-to-one combinations of matchup numerical images, however, these values are different from those of the tables of FIGS. 8-12. That difference results from how the numerical similarities were calculated. The numerical similarities for FIGS. 8-12 where calculated using the mean color overlap. In contrast, the numerical similarities for FIG. 13 were calculated based upon the edge ratio overlap (ERO) component of the SQ Algorithm, except that here the ERO calculation is used independent of the SQ Algorithm and, as such, represents just one of the many ways a numerical similarity may be calculated, so long as that calculation provides some rational basis for comparing numerical images. The circled scores 0.816, 0.963, 0.957, and 0.943 are the ERO based numerical similarities for the combinations used in the matchups. In this case, the numerical score 1303 is again the sum of the numerical similarities for four matchups. Here, there have been four matchups and this FIG. 13 game design specifies that a numerical score for this round of game play equals the sum of the numerical similarities for any matchups. For this case, the edge ratio overlap based total numerical score is 3.679.

Figure 14:

FIG. 14 depicts viewable images for four comparison linked numerical image sets. The sets originate with germinal numerical images GNI1, GNI2, GNI3, and GNI4, and the viewable images represent five members of each set. An identity transform forms a set member, CLNI1a, identical to GNI1, while subdivision transforms form members CLNI1b-e (indicated by dotted lines). Set members CLNI2a-e, CLNI3a-e, and CLNI4a-e are likewise formed from GNI2, GNI3, and GNI4, respectively.

Figure 15:
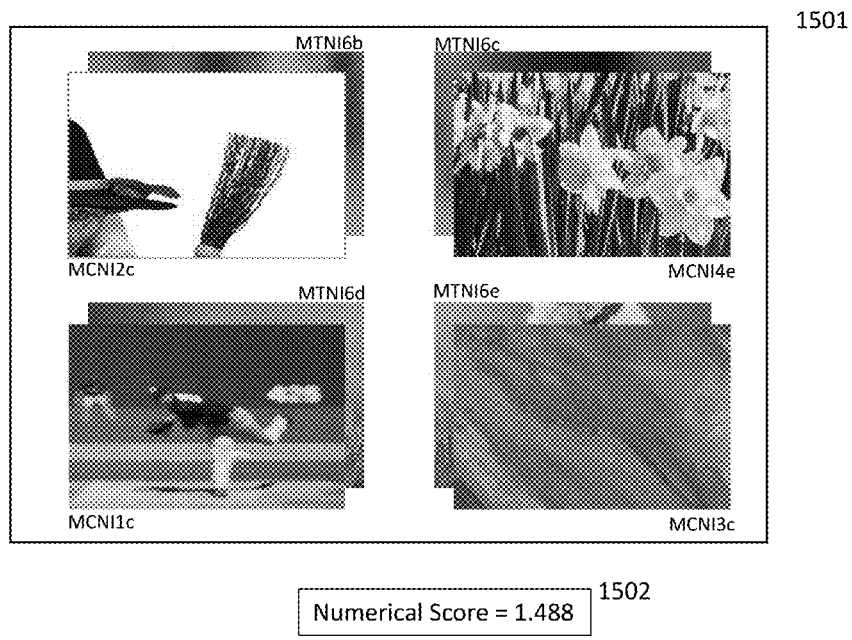

FIG. 15 represents an excerpt from a round of game play in progress or just finished, dependent on game design and player choice, including a diagrammatic representation of a portion of the display 1501. Comparison LNI set members CLNI1c, CLNI2c, CLNI3c, and CLNI4e have been chosen (and qualified, when qualifying is, optionally, required) to be matchup comparison numerical images to be referenced in the step of comparing a matchup comparison numerical image with a matchup target numerical image. In that way, CLNI1c, CLNI2c, CLNI3c, and CLNI4e become, respectively, MCNI1c, MCNI2c, MCNI3c, and MCNI4e. MCNI2c, MCNI4e, MCNI1c, and MCNI3c are then matched, respectively, with matchup target numerical images MTNI6b, c, d, and e, with numerical similarities calculated for each match using mean color overlap (MCO). The numerical score 1502, calculated as the sum of the numerical similarities for all four matchups, is 1.488.

FIG. 16 is a tabulation of numerical similarities calculated using mean color overlap for all matchups between any of MCNI1b-e, MCNI2b-e, MCNI3b-e, and MCNI4b-e and any of MTNI6b-e. The circled numerical similarity values are the values calculated for the matchups of FIG. 15 and summed to equal numerical score 1502 (=1.488) of FIG. 15.

Figure 17:
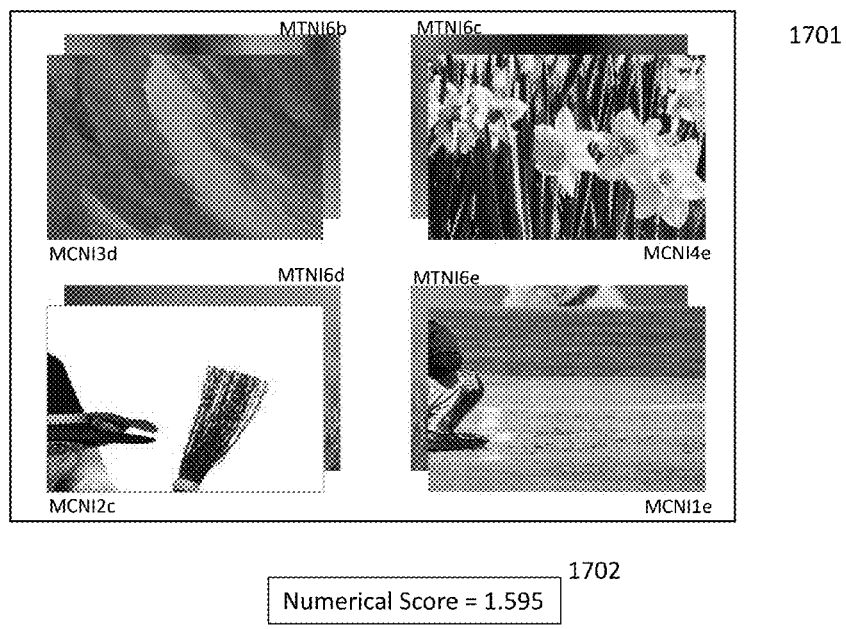

FIG. 17 represents an excerpt from a round of game play in progress or just finished, dependent on game design and player choice, including a diagrammatic representation of a portion of the display 1701. The round of game play has identical or similar game play constraints relative to the round of game play of FIGS. 15 and 16. Here, however, player choice has resulted in different matchups, leading to a higher numerical score than was calculated for the player choices of FIGS. 15 and 16. Here, comparison LNI set members CLNI1e, CLNI2c, CLNI3d, and CLNI4e have been chosen (and qualified, when qualifying is, optionally, required) to be matchup comparison numerical images to be referenced in the step of comparing a matchup comparison numerical image with a matchup target numerical image. In that way, CLNI1e, CLNI2c, CLNI3d, and CLNI4e become (that is, are designated to clarify that they are being used in matchup pairings), respectively, MCNI1e, MCNI2c, MCNI3d, and MCNI4e. MCNI3d, MCNI4e, MCNI2c, and MCNI1e are then matched, respectively, with matchup target numerical images MTNI6b, c, d, and e, with numerical similarities calculated for each match using mean color overlap (MCO). The numerical score 1702, calculated as the sum of the numerical similarities for all four matchups, is 1.595. This numerical score, the basis for which is depicted in this figure and FIG. 18 that follows, is the result of different player choices than were made during the round of game play depicted by FIGS. 15 and 16. Those player choices could have been made, for example, by the same player in both rounds, or by different players in the same round. In either case, the matchups depicted in FIG. 17 resulted in a higher score than the matchups of FIG. 15.

FIG. 18 is a tabulation of numerical similarities calculated using mean color overlap for all matchups between any of MCNI1b-e, MCNI2b-e, MCNI3b-e, and MCNI4b-e with any of MTNI6b-e. The circled numerical similarity values are the values calculated for the matchups of FIG. 17 and summed to equal numerical score 1702 (=1.595) of FIG. 17.

The terminology of this specification includes words specifically mentioned herein, derivatives thereof, and words of similar import.

Used herein, the following terms have these definitions:

The words "a" and "an" as used in the specification mean "at least one", unless otherwise specifically stated.

"Range". Disclosures of ranges herein take the form of lower and upper limits. There may be one or more lower limit and, independently, one or more upper limit. A given range is defined by selecting one lower limit and one upper limit. The selected lower and upper limits then define the boundaries of that particular range. Unless otherwise stated, ranges that can be defined in this way are inclusive and combinable, meaning that any lower limit may be combined with any upper limit to delineate a range. For example, if ranges of at least 60 to no more than 120 and at least 80 to no more than 110 are recited for a particular parameter, it is understood that the ranges of at least 60 to no more than 110 and at least 80 to no more than 120 are also contemplated. In the present invention, ranges are understood to be continuous unless otherwise stated. A continuous range contains its extrema and all values in between. That is, the continuous range from at least 60 to no more than 120 includes 60 and 120, while the range 60<x<120 includes all values of x between exactly 60 and exactly 120, but not the exact values 60 or 120. A discontinuous range includes its extrema, but not all values in between such that it is made up of at least two sub-ranges, wherein those sub-ranges may be either continuous over multiple numbers or may be a single number (e.g., the integer 10).

It will be appreciated by those skilled in the art that changes could be made to the suitable embodiments and examples specifically described herein without departing from the broad inventive concept thereof. It is understood, therefore, that this invention is not limited to the particular suitable embodiments and examples disclosed, and that recitation thereof is intended to additionally cover modifications within the spirit and scope of the present invention as disclosed herein and as defined by the appended claims.

It is understood that the present invention, as delineated by the specific details of specification and implementation of game design consistent with that invention, will reside in and be executed by computer hardware and computer software without any particular limitation on the relative extent to which the hardware or software will be tasked with various aspects of that specification and implementation. Used herein, the phrase "hardware and software" is understood to include "firmware" unless explicitly stated otherwise, wherein firmware is the combination of persistent memory and programmable code and data stored in it. Firmware is held in non-volatile memory devices such as ROM, EPROM, and flash memory, and often provides the control program for a device. The terms "hardware," "software," and "firmware" then have their usual meaning in the art of computer design and programming, as would readily be recognized by one of ordinary skill therein. Further, an "image processing apparatus" is any computer device having the requisite computer hardware and computer software to perform the method of the present invention.

Any entity capable of playing the computer-based game of the method of the present invention is a "player." The term "player" then includes "human player," but could even include "animal player," wherein the animal player is a non-human animal sufficiently precocious, trained, or both to participate in game play in some significant way. Although a computer tasked with carrying out the method of the present invention will typically facilitate the conduct of that method at the hardware and software level, a computer may additionally function as a "computer-resident player." A computer may, in fact, function solely as a computer-resident player in cases in which a separate computer is carrying out the method of the present invention. The term "player" still further extends to "android," wherein the term android herein refers to a biologically interfaced human/computer combination wherein that biological interfacing includes augmentation of reasoning, memory, and other cognitive functions associated with game play. A human player is, then, a specific type of player, as is a computer-resident player, or even an android or sufficiently precocious animal.

When a computer-resident player plays the game of the present invention, any communication readable in any way at all by a human, or any condition or state induced in a rendering device, that indicates information input to the game program, that indicates the progress of game play, that indicates the results of game play, is tangible. In the same way, any other indicia providing monitoring of the design of a given round of game play, of computer-resident player choices, of how the computer-resident player is progressing, or of any other aspect of execution by the computer-resident player, is also tangible.

The scope of the method of the present invention envisions embodiments in which an individual player plays alone, or as part of a multiplayer grouping, wherein a multiplayer grouping can have two, three, four, or more players, including hundreds or thousands of players with no particular limit to that number, as typically associated with massively multiplayer game play. When more than one player is engaged in playing the game, those players may be variously configured for competition, co-operation, neutrality, or some other relationship, or combination thereof, with respect to other players. Multiple players may be grouped as teams, wherein the teams may compete, cooperate, be neutral, bear some other relationship, or some combination thereof, with respect to other teams, individual players operating alone, or individual players having some non-team relationship to one another, and combinations thereof. Note that there is no particular limitation to how a player may interact with other players during conduct of the game.

Still further, a multiplayer grouping may include any type of player. Just as there is no particular limitation to how an entity acting as a player can interact with another entity also acting as a player. For example, two human players may "play" the game of the present invention versus one another. Alternatively, a human player may "play" the game versus a computer that has been "programmed" to "play" the game. In another example, two different computers might play the game with one another. In the present invention, one, two, or many computers could function as players playing the game with or without human players. In fact, a single physical computer entity could programmatically create more than one "player," each of which could participate in game play in some relationship to one or more other such player, or any other players at all.

A "pre-digital information source," alternatively "pre-digital source," is any source of information, wherein that information being sourced is not resident on a computer, but is capable of being digitized to create a numerical image. Illustrative examples of "pre-digital information source" include, but are not limited to: a scene that is an analog entity derived from Nature, such as a lion stalking on an African savanna, a cluster of galaxies a hundred million light years away in outer space, or the internal structure of a red blood cell; a scene that is a surface or some cross-sectional element of any artificial object, such as an original oil painting or bronze sculpture, or some portion of an automobile; an analog depiction, such as a sketch on a paper page of a sketchbook, a photographic print drying after removal from a developer bath, an arrangement of Chinese characters deposited on parchment using calligraphic pen or brush, an arrangement of alphanumeric characters such as a hand written table of numbers having column headings in French with the relationships among the numbers indicated by hand drawn lines; categorizable occurrences, such as phone calls, airline flights through Amsterdam, ship registrations in Liberia, or DNA strands or portions thereof in animal populations; and a "neurological visual impression" within a human brain, such as likely occurred within Salvador Dali's brain as he was visualizing his painting The Persistence of Memory before ever taking brush to canvas, and perhaps as he remembered that painting long after completing it.

"Digitizing" is the forming of a numerical image from a pre-digital information source wherein the numerical image formed is a digital representation of that pre-digital information source. The process of digitizing is referred to as "digitization," and the information of the pre-digital information source is "digitized" during the formation of a numerical image representative of that pre-digital information source. This digitizing may or may not include forming a numerical image containing color information.

While it may often be the case that information extractable from a particular pre-digital information source will be digitized to form a numerical image representative of that pre-digital information source, it is also possible that a numerical image might not originate from any pre-digital information source at all. As a non-limiting example, a programmer might construct a computer program capable of forming a variety of numerical images. The output of that program might potentially be one, a few, hundreds, thousands, or millions of numerical images, yet the programmer may never have "visualized," that is, had a neurological visual impression of some or any of those numerical images. When a computer program, which is digitized and numerical, has the function of creating a numerical image absent any pre-digital information source, that computer program is termed a "programmatic digital source." A numerical image can, therefore, be created based upon a pre-digital information source, a programmatic digital source, or a combination thereof.

A "numerical image," interchangeably "NI," is a structured grouping of computer-resident numerical elements wherein all, or some portion, of those numerical elements are related to one another. A "numerical element" is then a number, to which meaning may be attached, that is the fundamental unit of digitized information making up the numerical image. In the method of the present invention, the structured grouping of numerical elements that is a numerical image may, for example, be made available to be operated upon by one or more transform to form another, derivative, numerical image, or to be referenced by an image-rendering device to form a viewable image. In the later case, the numerical image would have to be a color numerical image. It may further be convenient to think of a numerical image during computer processing as a rectilinear stream of numerical elements, at least some of which have a relationship to one another, and from which spatial information, color information, or both may be derived, or to which spatial information, color information, or both may be assigned at some point.

Used herein the term "color" is the visual perceptive property corresponding in humans to the categories called, for example: red, yellow, green, blue, and violet. The visible spectrum, i.e., the wavelengths of light humans can perceive by way of their visual systems, extends from approximately 390 nanometers (nm) to approximately 700 nanometers, from the shortest violet wavelengths to the longest red wavelengths, respectively. A "color numerical image," interchangeably "color NI," of the present invention is a numerical image containing "color information" describing the intensity of one or more wavelength selected from the visible spectrum (i.e., visible light), wherein that information is sufficient to provide a basis for rendering, by a rendering device, to form a "viewable image" representative of that numerical image. When some portion of the color information of a color numerical image, that can be referenced during rendering to determine the intensity of a display pixel, indicates an approximately equal intensity of light wavelengths across the visible spectrum, that color information renders as white or approximately white for high intensities, black for zero or near zero intensities, and shades of gray for intermediate intensities. The color information contained in a color numerical image can then indicate any combination of visible wavelengths and intensities, such that viewable images may be rendered from that color NI having colors perceivable as red, yellow, green, blue, violet, all intermediate colors (e.g., magenta between red and blue, and cyan between blue and green), white, black, and shades of gray. The color information of a color numerical image, therefore, may include grayscale information, and white, black, and shades of gray are, herein, considered to be colors.

A "colorless numerical image" of the present invention is a numerical image containing no color information, or color information insufficient to provide a basis for rendering, by a rendering device, to form a "viewable image".

By definition, a color numerical image is capable of being rendered by a rendering device to form a "viewable image." That is, any color NI can be rendered to cause a specific condition or state in rendering device hardware such that the viewable image derived from, and therefore linked to that color NI may be observed by any player having visual capability. The viewable image is therefore tangible, as is the condition or state of the rendering hardware that provides the viewable image for observation by a player. The viewable image can be seen and visually compared with other viewable images.

A "linked numerical image set," interchangeably "linked NI set" or "LNI set," is a numerical image set, each member of which is derived from the same germinal numerical image through the operation of one or more transform, operating in a specific order. As such, each of those members is referred to as a "linked numerical image," interchangeably "linked NI" or "LNI." Each of those members is also considered to be a "derivative linked numerical image," interchangeably "derivative LNI" or "DLNI," with respect to the germinal numerical image from which it was derived.

A "germinal numerical image library," interchangeably "germinal NI library" or "GNI library," is a collection of one or more "germinal numerical image," interchangeably "germinal NI" or "GNI," each of which is a numerical image available for use in constructing a linked numerical image set of the present invention. As such, a germinal numerical image library resides in computer memory, and there is no particular limitation to where a germinal numerical image library resides in computer memory. It is further understood that a germinal numerical image library may be distributed across multiple computers and storage media located in multiple physical locations. Essentially any device capable of performing one or more of the characteristic computer-based functions of storing, generating, converting, retrieving, and transferring a numerical image may be a source of a germinal numerical image for the germinal numerical image library. As such, a non-exhaustive list of devices upon which germinal numerical images of the germinal NI library can be stored and processed includes: an image generating device such as a still or motion picture camera, a local device (e.g., smart phone and webcam), and renderer (e.g., plotting/visualization program, algorithmic, and programmable); a locally resident repository such as a file system, storage medium, storage device, or database; a network-resident repository such as a file system, storage medium, storage device, or database; and the hardware and software utilized during preparation for and execution of the game play of the method of the present invention. Herein the term "network" includes devices hardwired for communication, devices configured for wireless communication (e.g., WiFi, Bluetooth, cellular, and the "Cloud"), and combinations thereof.

There is no particular limit to the type of numerical image that can be a germinal numerical image of the germinal numerical image library. As such, the numerical image may derive from a pre-digital information source, or a programmatic digital source, and may be a color numerical image or a colorless numerical image, with the proviso that, when a germinal NI is a colorless numerical image, it must be capable of being transformed into a color NI according to some rational color assignment scheme. The present invention envisions GNI libraries that contain only color GNI, that contain only colorless GNI, and that contain both color GNI and colorless GNI. A non-exhaustive list of these numerical image types includes a numerical image of: a frame of a still photograph; a frame of a motion picture; a frame of a multi-slice still picture of a 3-D object; a frame of a multi-slice motion picture of a 3-D object; portions of any of the aforementioned frames; combinations of any of the aforementioned frames or portions thereof; a numerical image formed by digitization of a pre-digital information source that is a collection of analog data; and a numerical image generated by a computer program wherein that numerical image is not derived from another numerical image (i.e., a programmatic digital source). In an illustrative example of a multi-slice still picture of a 3-D object, a three dimensional object is the pre-digital information source, multiple cross-sectional planes of which are sampled and digitized to form multiple numerical images, as is the case wherein a CAT (computer axial tomography) scan or MRI (magnetic resonance imaging) is performed upon a person or other pre-digital information source. Although the multiple cross-sectional planes need have no particular spatial orientation with respect to one another, common relationships include parallel, coincident axis through which all planes pass, central point through which all planes pass, and random. An illustrative example of a multi-slice motion picture of a 3-D object is a time dependent cardiac MRI of a beating heart. Moreover, the MRI scans themselves may functionally image relative relaxation rates of proton relaxation rates (T1, T2), or spatial/concentration distributions of specific nuclei (e.g., 1H, 13C, 14H, 41K), further expanding the number of numerical images.

Further, the hardware and software utilized during preparation for and execution of game play could provide a new germinal numerical image for the germinal numerical image library. For example, a member of a linked numerical image set of the present invention could be provided to the germinal numerical image library at any time during or after generation of that member. In this way, a germinal numerical image of the germinal numerical image library could be utilized to construct a linked numerical image set and, at some point during preparation for, or execution of game play, or even subsequent to game play, a member of the linked numerical image set that had been constructed from the original germinal numerical image could be made available for inclusion in the germinal numerical image library as new germinal numerical image.

From the foregoing definition of "germinal numerical image library," it will be recognized that the scope and design of that germinal numerical image library will be defined as part of game design. As a non-limiting example, a germinal numerical image library from which the germinal numerical images of the method of the present invention are drawn might be located within a single storage device, with specific germinal numerical images being utilized during game play. Of course, the germinal numerical images of the germinal numerical image library could have originated anywhere that a numerical image could be generated, including any of the sources enumerated herein. Alternatively, game design might dictate a highly distributed germinal numerical image library, perhaps including storage on multiple servers and mass storage devices, as well as hand-held devices used by multiple players. When multiple devices are involved, there is no particular limitation to how they may be distributed, with any given device potentially being located anywhere in the world, including the Earth's atmosphere, anywhere in the Solar System, and beyond. It is further understood that the germinal numerical images, and their number, included in a germinal numerical image library may be: static; or dynamically varying, with germinal numerical images being added to or subtracted from the germinal numerical image library on a continual basis. It is still further understood that any germinal numerical image of the method of the present invention is, by default, a member of the germinal numerical image library, whether or not the actual term "germinal numerical image library" is utilized. In this way, "providing a germinal numerical image library" may be as simple as taking a single photograph with a digital camera and making an associated numerical image for that photograph available and accessible for use in game play.

According to the method of the present invention, the constructing of a linked numerical image set (LNI set) is accomplished by the steps of selecting a germinal numerical image from the germinal numerical image library, and populating the linked numerical image set with one or more linked numerical image, wherein each linked numerical image is derived from that same selected germinal numerical image. The step of populating the linked numerical image set is accomplished by forming each linked numerical image by the further steps of: specifying one or more transform; specifying an order in which the one or more transforms are to operate upon the germinal numerical image to form the linked numerical image; and forming the linked numerical image through the operating, upon the selected germinal numerical image, of the one or more specified transform in the specified order. The word "linked" indicates that a member of a linked numerical image set is derived from the same germinal numerical image as any other member of that same linked numerical image set, and is therefore also a "derivative numerical image" of that germinal NI. A linked numerical image may be a color numerical image or a colorless numerical image.

It is further within the scope of the present invention that two or more GNI may be merged during construction of a linked numerical image set. In such case, any merging transform, or any combination of transforms having the effect of merging all or portions of those two or more GNI, is considered to have operated to form a new, merged, GNI. That new, merged, GNI is further, by default, considered to be a member of the GNI library to which the pre-merging germinal numerical images belong and, as such, is the originating GNI for the constructed LNI set. That new GNI is a member of the GNI library regardless of whether it is deposited in its entirety in computer memory or other hardware storage. Even in the absence of such deposition, the formation of a serial stream or streams (e.g., as part of a numerical image pipeline) carrying sufficient data to define the new GNI such that an LNI set can be constructed from it qualifies that new GNI as a member of the GNI library, and as the originating GNI from which that LNI set is derived.

In the method of the present invention, one type of linked numerical image set that is constructed is a "target linked numerical image set," interchangeably "target LNI set" or "TLNI set." Because a target linked numerical image set is simply a linked numerical image set having a further defined function in the present invention, the terms already defined generally for any linked numerical image set obtain for the target linked numerical image set, except that the word "target" is included in the term. In that way, for example, "linked numerical image" becomes "target linked numerical image" ("target LNI" or "TLNI"), and "linked numerical image set" becomes "target linked numerical image set" ("target LNI set" or "TLNI set"). Depending upon game design, a given round of game play includes one or more target linked numerical image set (see FIG. 6), with no particular limit to the number of such sets. Further, when two or more target LNI sets are constructed and two or more target LNI are assigned to be matchup target numerical images for the purpose of calculating a particular target numerical descriptor, those target LNI may be assigned from a single target LNI set or multiple target LNI sets, depending on game play constraints and player choice.

Similarly, another type of numerical image set that is formed is a "comparison linked numerical image set," interchangeably "CLNI set." Because a comparison linked numerical image set is simply a linked numerical image set having a further defined function in the present invention, the terms already defined generally for any linked numerical image set obtain for the comparison linked numerical image set, except that the word "comparison" is included in the term. In that way, for example, "linked numerical image" becomes "comparison linked numerical image" ("comparison LNI" or "CLNI"), and "linked numerical image set" becomes "comparison linked numerical image set" ("comparison LNI set" or "CLNI set"). Depending upon game design, a given round of game play may include one or more comparison linked numerical image set (see FIG. 7), with no particular limit to the number of such sets. Further, when two or more comparison LNI sets are constructed and two or more comparison LNI are chosen to be matchup comparison numerical images for the purpose of calculating a particular comparison numerical descriptor, those comparison LNI may be chosen from a single comparison LNI set or multiple comparison LNI sets, depending on game play constraints and player choice.

While a target LNI set may typically be constructed from a different germinal numerical image than the germinal numerical image from which a comparison LNI set is constructed (see FIG. 2A), a target LNI set and a comparison LNI set may also be constructed from the same germinal NI (see FIG. 2E). When a target LNI set and a comparison LNI set are constructed from the same germinal NI, those sets may be identical or non-identical, with no particular limitation upon what transform or transforms may be used to form a given set member, upon the order in which multiple transforms might be applied, or upon what the resulting member can be. Of course, for example, a game play constraint could be set requiring that any germinal NI used to construct a comparison LNI set must be different from any germinal NI used to construct a target LNI set.

A "transform" is a mathematical operation capable of transforming a numerical image into another, derivative, numerical image. During the populating of a linked numerical image set, the forming of a linked numerical image from a germinal numerical image may be accomplished by: specifying one or more transform; specifying an order in which the one or more transforms are to operate upon the germinal numerical image to form the linked numerical image; and forming the linked numerical image through the operating, upon the germinal numerical image, of the one or more transform in the specified order, i.e., according to a transform sequence. It is understood that, when only one transform is specified, the step of specifying an order for transform operation indicates that the single transform simply operates upon the germinal numerical image. It is further understood that, while a transform will typically operate to transform a numerical image into a derivative numerical image that is not identical when compared to the numerical image transformed to create it, an "identity transform" may also obtain. An "identity transform" is a transform that operates upon a numerical image in such way that the resultant derivative numerical image is identical to that numerical image from which it was derived. In the method of the present invention, the operation of an identity transform upon a germinal numerical image forms a linked numerical image identical to that germinal numerical image (see FIGS. 4 and 5A). It is understood and emphasized that the operating of an identity transform upon a germinal numerical image explicitly includes accomplishing that operation either through a mathematical operation that causes no change in that numerical image, or simply through adding the germinal numerical image to the linked numerical image set. As such, the populating of a linked numerical image set with a linked numerical image identical to the germinal numerical image for that LNI set is deemed to be accomplished by the operation of an identity transform.

It is further understood that a "transform" is accomplished through the mathematical operation of one or more "numerical conversion," wherein each numerical conversion is be accomplished through hardware and software means. There is no particular limit to the type of transform that can operate upon a numerical image, or to the type of numerical conversion used in the operation of a given transform, division by zero excepted. For example, it is within the scope of the present invention that a transform may operate upon a numerical image to select a subdivision of that numerical image to be numerically converted to another numerical image, or to simply be separated from that larger numerical image to form another numerical image.

Beyond the formation of a linked numerical image from a germinal numerical image, one or more transform may also operate, during the step of comparing one or more matchup comparison numerical image with one or more matchup target numerical image, to effect the calculating of: a target numerical descriptor; a comparison numerical descriptor; or a numerical similarity. One or more transform may further operate during the step of calculating a numerical score.

This non-exhaustive list of types of transform includes many, but not all, of the transform types suitable for use in the game method of the present invention. A transform may be an "identity transform." Another type of transform is an "arithmetic transform." Arithmetic transforms include: addition, subtraction, multiplication, division; absolute difference; linear combination; and modulus. "Logical transforms" include Boolean operators such as: AND, OR, NOT, NAND, NOR, and XOR operators. "Geometric transforms" include subdivision transforms such as: regular grid (M×N equally spaced "checkerboard"); irregular grid (M×N with non-identical spacing); angular grid (pie slices); radial grid (concentric donuts); angular×radial grid; and Quadtree decomposition. Geometric transforms further include resizing transforms, both expansion and reduction, including: cropping (reduction); padding (expansion); interpolation, e.g., nearest-neighbor, bilinear, and bicubic; and pyramidal, examples of which are found in Burt and Adelson, "The Laplacian Pyramid as a Compact Image Code," IEEE Transactions on Communications, vol. COM-31, no. 4, April 1983, pp. 532-540. Additional Geometrical transforms include: rotation; flipping (horizontal, vertical, arbitrary axis); mirroring; and warping.

"Filtering transforms" include: neighborhood/block processing transforms with different kernel types and sizes; edge detection transforms; Hough transforms detecting lines; 2-D convolution transforms; Fourier filtering transforms; discreet cosine transform (DCT); and Radon transforms. Neighborhood/block processing transforms include: linear statistical—mean filtering; non-linear statistical, such as median, order, standard deviation, variance, minimum, and maximum; morphology, such as erosion, dilation, opening, and closing; and Gaussian and gradient. Edge detection transform types include: Sobel; Prewitt: Roberts; Laplacian;

zero crossing; Canny; and image contour. Fourier filtering transform types include: high pass; low pass; band pass; notch; and multi.

Transform types still further include: "texture transforms," such as fft and DCT, and co-occurrence; "segmentation transforms," such as thresholding, watershed, Quadtree decomposition, and blob properties; "sharpening transforms;" "blurring transforms;" "noise addition transforms;" and "noise removal transforms." "Color manipulation transforms" suitable for manipulation of the color and intensity of visible light include: brightness; contrast; arbitrary non-linear; shifting; complement; other angular; histogram stretching; histogram equalization; and conversion to and from colorspace, wherein any colorspace might be utilized, including: RGB, sRGB; HSV,HSL, HIS; LAB, XYZ; NTSC; YCbCr; CMYT; and Grayscale. Such transforms may further manipulate visible light intensity. The various colorspaces just enumerated are among the well-known methods of representing color. Many of these aforementioned transform types and specific examples of transform types are included in MATLAB Version 7.5.0.342 and the Image Processing Toolbox Version 6.0 by The MathWorks, Inc. "Colorizing transforms" are used to transform colorless numerical images into color numerical images.

A "numerical image merging transform," interchangeably "NI merging transform," operates to merge two or more numerical images or portions thereof to form a derivative numerical image. The term "NI merging transform" may refer to a single transform, but also encompasses multiple transforms operating to effect a merging of numerical images. A numerical image merging transform may operate to merge GNI of the GNI library to form a new GNI for that library. A numerical image merging transform may also be used during calculating of a target numerical descriptor or a comparison numerical descriptor, based on two or more matchup target numerical images or matchup comparison numerical images, respectively.

A "numerical image processing pipeline," interchangeably "NI processing pipeline," is a sequence of one or more transform by which a given numerical image is numerically converted to a another numerical image that is a derivative thereof, wherein that derivative numerical image is the result of those transforms operating in a specific order with respect to one another.

A "matchup target numerical image," interchangeably "matchup target NI" or "matchup TNI," is one of one or more target linked numerical image assigned from one or more target linked numerical image set to serve as the basis for calculating a target numerical descriptor (see FIG. 6). It is a requirement of the method of the present invention that, to be a matchup TNI, a target LNI must be a color numerical image.

A "matchup comparison numerical image," interchangeably "matchup comparison NI" or "matchup CNI," is one of one or more comparison linked numerical image chosen from one or more comparison linked numerical image set to serve as the basis for calculating a comparison numerical descriptor (see FIG. 7). It is a requirement of the method of the present invention that, to be a matchup CNI, a comparison LNI must be a color numerical image.

A "target numerical descriptor" is a calculated numerical description of one or more matchup target numerical image, wherein that numerical description is suitable for use in calculating a "numerical similarity." A target numerical descriptor is calculated from one or more matchup target numerical image in any manner suitable for comparing with a comparison numerical descriptor for the purpose of calculating a numerical similarity. Examples of numerical descriptors (i.e., target or comparison) calculable from one or more numerical image include, but are not limited to: mean value, mode value, standard deviation, minimum value, maximum value, number of distinct clusters, means of the clusters, and number of members in each cluster.

A "comparison numerical descriptor" is a calculated numerical description of one or more matchup comparison numerical image, wherein that numerical description is suitable for use in calculating a "numerical similarity." A comparison numerical descriptor is calculated from one or more matchup comparison numerical image in any manner suitable for comparing with a target numerical descriptor for the purpose of calculating a numerical similarity.

In the case wherein a target numerical descriptor is based upon a single matchup target numerical image, that target numerical descriptor will typically not be identical to the single matchup numerical image from which it is calculated. However, that identity calculation is included among the possible ways to calculate a target numerical descriptor, such that the matchup target numerical image and the target numerical descriptor are one in the same. In this way, an identity calculation is also possible in the case wherein a comparison numerical descriptor is based upon a single matchup comparison numerical image. Herein the calculating of a numerical descriptor, either target or comparison, that is identical to the matchup numerical image upon which the calculating was done, includes the case of simply using that matchup numerical image as is.

A "numerical similarity" is calculated based upon a comparison numerical descriptor and a target numerical descriptor. A "numerical similarity" is a measure of the extent to which the one or more matchup comparison numerical image, as described by the comparison numerical descriptor, are similar to the one or more matchup target numerical image, as described by the target numerical descriptor. There is no particular limitation upon the computational method that can be used to calculate the numerical similarity. Examples of these computational methods include, but are not limited to: distance as calculated by Euclidean, City Block, Chessboard, and Quasi-Euclidean methods; difference; absolute difference; and combinations thereof.

A "numerical score," interchangeably "score," is an indicator of the progress of game play. A numerical score may be used in a variety of ways including, but not limited to providing: feedback (e.g., continuous, continual, occasional, or periodic feedback) to the player so that the player can be informed of the player's progress toward improved play; a basis for specifying subsequent game play; data for cumulative scoring; data for determining how one player's game playing performance compares with that of another player; and data that can be combined in some way with numerical scores for other players to create a group score. It is herein emphasized that not only can the player make use of the numerical score, but also the computer hardware and software upon which the method of the present invention is executed may utilize the numerical score to determine one or more aspects of previous, current, or subsequent rounds of game play.

Determination of a numerical score includes the step of comparing one or more matchup comparison linked numerical image with one or more matchup target linked numerical image, wherein the comparing includes the further steps of: calculating a comparison numerical descriptor, based on the one or more matchup comparison linked numerical image; calculating a target numerical descriptor, based on the one or more matchup target linked numerical image; and calculating a numerical similarity based on the comparison numerical descriptor and the target numerical descriptor. Dependent upon game design and player choice, a "round of game play," interchangeably "round," may be completed after calculation of a single, a few, or many numerical scores. It is further a requirement of the method of the present invention that, for a round of game play to be complete, at least one numerical score must have been calculated.

It is further within the scope of the method of the present invention to repeat (see FIG. 2B and its detailed description) the steps of: assigning one or more target linked numerical image from one or more target linked numerical image set to be a matchup target numerical image (see FIG. 6); choosing one or more comparison linked numerical image from one or more comparison linked numerical image set to be a matchup comparison numerical image (see FIG. 7); comparing the one or more matchup comparison numerical image with the one or more matchup target numerical image by calculating numerical descriptors and calculating a numerical similarity; and calculating a numerical score. The repeating is continued until an "outcome" consistent with game design and player choice is achieved, signaling the end of a round of game play.

It is still further within the scope of the method of the present invention that the step of constructing a comparison linked numerical image set may include the construction of multiple comparison LNI sets, each from a single selected germinal numerical image. While construction of at least one of these CLNI sets by populating it with at least one member must be accomplished prior to first performing the step of choosing a comparison LNI to be a matchup CNI, additional CLNI sets may be constructed and existing sets further populated at any point during subsequent execution of the method, until the last matchup CNI or the round has been chosen.

In like manner, the step of constructing a target linked numerical image set may include the construction of multiple target LNI sets, each from a single selected GNI. While construction of at least one of these TLNI sets by populating it with at least one member must be accomplished prior to first performing the step of assigning a target LNI to be a matchup TNI, additional TLNI sets may be constructed and existing sets further populated at any point during subsequent execution of the method, until the last matchup TNI or the round has been chosen.

The method of the present invention may, optionally, include the further step of "setting a game play constraint" (see FIG. 2D). That setting of a game play constraint may occur at any point in the method, so long as that point precedes any step, or portion of any step being constrained such that the full effect of the constraint can be exerted. A non-exhaustive list of types of game play constraint includes: a numerical image constraint (e.g., a constraint upon: a germinal NI, a target LNI, a comparison LNI, a matchup target NI, or a matchup comparison NI); a transform type constraint; a transform sequence constraint (i.e., the order in which transforms are to operate); a viewable image constraint; a time constraint; and combinations thereof. The transform constraint includes constraints upon transforms belonging to transform types detailed hereinabove: identity transform; arithmetic transform; logical transform; geometric transform; filtering transform; texture transform; segmentation transform; sharpening transform; blurring transform; noise addition transform; noise removal transform; color manipulation transform; and colorizing transform. While this list of transform types includes many of the prominently used transform types, the list is non-exhaustive. A transform constraint controls (e.g., requires, excludes, or otherwise restricts the use of one or more transform of one or more type in a given step of the method, optionally in concert with a transform sequence constraint controlling (e.g., requiring, excluding, or otherwise restricting) the order in which the transforms may operate.

When the method includes a step of setting a game play constraint, one or more game play constraint may be set with no particular limit to number or type of game play constraint, and a single type or multiple types of game play constraint may be set. It is understood that the setting of game play constraints may be done to define the boundaries for a particular round or level of game play, thereby requiring, excluding, or otherwise restricting the use of: certain types of numerical image, transform types, transform numbers, and transform sequences). Rounds played within a given level are governed by the constraints that define the level, and may also include, for example, further constraints set according to player choice before or during a round of game play. A "level of game play," interchangeably "level," will be recognized by one of ordinary skill in the art of computer game design to be a category of game play characterized by certain constraints, such that the various levels are differentiable one from another. It is common, but by no means necessary, practice to associate, or even assign, degrees of difficulty to different levels, such that a player may "level up," playing at increasingly high degrees of difficulty as the player's skills improve, as the player's achievements are recognized, or as the player simply becomes more ambitious. Typically, but not necessarily, rounds are grouped into levels, and a player may play one or many rounds at a given level. It is further understood that, while it is often the case that rounds of game play may be explicitly assigned to levels, such explicit assignment is not a requirement of the present invention. That is, a game may be played absent explicitly specified level categories. Moreover, if levels are, optionally, explicitly specified, the constraint-based character of each of the levels may be arbitrarily or systematically specified as a matter of game design.

The following examples of game play constraints representative of what the various types of game play constraint may be are meant to be illustrative and in no way limiting. In general, a "numerical image constraint" might specify that the numerical image: is a color NI; is a colorless NI; is a color NI emphasizing certain portions of the visible spectrum over others; contains information from regions of the electromagnetic spectrum outside the visible spectrum; excludes certain kinds of information; or contains at least some information unrelated to color. Numerical image constraints may be applied to any of the numerical images, including germinal NI, target LNI, and comparison LNI. Numerical image constraints may also be applied to the assignment of a target LNI to be a matchup target NI ("matchup TNI constraints") or choice of a comparison LNI to be a matchup comparison NI ("matchup CNI constraints").

Non-exhaustive examples of "transform type constraint" include constraints that: a "color manipulation transform," a "geometric transform," a "colorizing transform," or a "numerical image merging transform" ("NI merging transform") is required, excluded, or otherwise restricted (i.e., constrained). Examples of "transform sequence constraint" include constraints that, when two or more transforms are specified to operate upon a numerical image, those transforms may operate, must operate, or must not operate, in some specific order. "Viewable image constraints" include constraints upon whether or not viewable images renderable from certain color numerical images may actually be rendered to form viewable images during a round of game play. Non-limiting examples of numerical images to which such constraints may apply include: germinal NI, target LNI, comparison LNI, matchup TNI, and matchup CNI. There is no particular limit to the kind of color manipulation, numerical image subdivision, colorizing, or other transform that can be required, excluded, or otherwise restricted by game play constraint. A color manipulation constraint might, for example, emphasize one group of hues of a numerical image over others such that a viewable NI rendered from the derivative numerical image would emphasize those hues (e.g. emphasizing reds over blues and greens, or decreasing all hues to approach gray scale). Beyond hue, any other color characteristic (e.g., saturation, brightness) could be modified. A color manipulation transform might instead operate to transform the colors of a numerical image to their complements. A subdivision transform might operate upon a numerical image to create a derivative NI, wherein the viewable image of the derivative NI represents a portion (i.e., subdivision) of the viewable image of the numerical image upon which the transform operated. Further, a color manipulation transform type might be a shifting transform operating to shift color positioning during formation of a derivative NI, as represented by its linked viewable image, when compared with the viewable image of the numerical image upon which the transform operated.

The method of the present invention further, optionally, includes a "matchup comparison numerical image constraint" ("matchup CNI constraint") that the step of choosing one or more comparison linked numerical image from one or more comparison linked numerical image set to be a matchup comparison numerical image further includes a qualifying step (see FIG. 3). The qualifying step determines whether a chosen comparison linked numerical image, termed a "potential matchup comparison numerical image," is suitable to be a matchup comparison numerical image according to game design, or optionally player choice. That qualifying step uses a Qualifying algorithm to determine the suitability of a potential matchup CNI to be a matchup CNI. The qualifying step may, for example, be included in the method of the present invention as a constraint governing the degree of difficulty for a particular level of game play, or to assure exclusion from game play of any potential matchup CNI that is identical to, or strongly similar to, or somewhat similar to any matchup target linked numerical image.

A "Qualifying algorithm," interchangeably "Q algorithm," calculates a "qualifying metric value," interchangeably "QMV," to determine if a given "potential matchup comparison numerical image," ("potential matchup CNI," "PMCNI"), is suitable, and therefore qualified, for designating as a "matchup comparison numerical image," ("matchup CNI," "MCNI"), for comparing with one or more "matchup target numerical image" ("matchup TNI," "MTNI"). Each QMV is calculated based upon a single potential matchup CNI and a single matchup TNI, termed a "matchup pairing." The calculated QMV is an indication of the similarity of that potential matchup CNI to that matchup TNI. Further, a QMV is calculated according to a given Q algorithm by the operation of the mathematical conversions of that particular Q algorithm, and the actual numerical value of any resultant QMV could be any numerical value, so long as that value reflects those mathematical conversions. There is no particular limitation upon what the mathematical conversions of a given Q algorithm can be, so long as the resulting qualifying metric values give an indication of how close a match the potential matchup CNI of a matchup pairing is to the matchup TNI of that same matchup pairing.

The qualifying step (see FIG. 3) of this matchup CNI constraint includes the further steps of: designating each chosen comparison linked numerical image to be a potential matchup CNI; defining a QMV inclusion range, wherein the QMV inclusion range contains less than all possible qualifying metric values; for each potential matchup CNI, calculating a qualifying metric value for each matchup pairing; and determining whether all matchup pairings have a qualifying metric value within the QMV inclusion range. Upon determining that all possible matchup pairings have a qualifying metric value within the QMV inclusion range, the potential matchup CNI is qualified to be a matchup comparison numerical image. Alternatively, upon determining that at least one matchup pairing has a qualifying metric value that falls outside of the QMV inclusion range, the potential matchup CNI is disqualified from becoming a matchup comparison numerical image.

Therefore, the optional qualifying step determines whether a given potential matchup CNI is suitable to become a matchup CNI based upon how close a match it is to every matchup TNI, taken one matchup TNI at a time. A QMV is calculated for each "matchup pairing" of the given potential matchup CNI with each assigned matchup TNI, taken one matchup pairing at a time. If all QMV for the given potential matchup CNI fall within the QMV inclusion range, the potential CNI becomes a matchup CNI. If less than all QMV fall within the QMV inclusion range, the potential CNI is disqualified and cannot be a matchup CNI based upon the particular matchup TNIs, the particular Q algorithm, and the particular QMV inclusion range currently at play. The qualifying step may be repeated as often as game design, player choice, and player inclination permit, at least until one potential matchup CNI is qualified to be a matchup comparison numerical image.

For any given Q algorithm, a "QMV inclusion range" (see FIG. 3) includes at least one, but less than all, of the QMV that the given Q algorithm is capable of calculating. A QMV inclusion range may further be continuous or discontinuous. For example, a given Q algorithm might be capable of calculating QMV ranging continuously from at least −25 to no more than 300. For that Q algorithm, a QMV inclusion range could be specified that extends from at least −25 to no more than 290, or from at least −15 to no more than 300, but not continuously over the entire range from at least −25 to no more than 300. Further, a QMV inclusion range could be a discontinuous combination of multiple sub-ranges, such as: $0 \leq QMV \leq 80$ plus $150 \leq QMV \leq 200$.

Because the full range of possible QMV extends continuously from at least exactly 0% to no more than exactly 100% of the full QMV range (percentage is used here because actual values may vary greatly depending upon Q Algorithm used), "QMV inclusion ranges" may span any portion, but not all, of that full range, and may be continuous or discontinuous. For example, the present invention contemplates QMV inclusion ranges of exactly zero percent to no more than 99.9 percent, and at least 0.1 percent to exactly 100 percent. Further contemplated are these exemplary, inclusive and combinable, range extrema: exactly zero percent, at least 0.5%, at least 1.0%, at least 5.0%, at least 10%, or at least 20%; and no more than 99.5%, no more than 99%, no more than 95%, no more than 90%, no more than 80%, no more than 70%, or no more than 50%. Also contemplated are these exemplary, inclusive and combinable, range extrema: at least 80%, at least 90%, at least 95%, at least 99%, or at least 99.9%; and no more than 100%.

The QMV of the qualifying step may further be a "Specific Qualifying Metric Value," interchangeably "SQMV," wherein an SQMV is a QMV calculated by one specific Q algorithm, wherein that one specific Q algorithm is the "Specific Qualifying Algorithm," interchangeably "SQ Algorithm." The description of the SQ Algorithm is explicitly set forth herein, as is the computer code by which the SQ Algorithm calculates an SQMV from a matchup pairing of a potential matchup CNI with a matchup TNI. The possible specific qualifying metric values an SQ Algorithm is capable of calculating extend continuously from at least exactly zero to no more than exactly one, such that: a value of exactly one indicates the highest degree of similarity of the potential matchup CNI to the given matchup TNI (e.g., identical) of a matchup pairing; a value of exactly zero indicates the highest degree of dissimilarity; and values between exactly zero and exactly one indicating intermediate degrees of similarity. For example, an SQMV of 0.9 indicates a higher degree of similarity than does an SQMV of 0.3.

The Specific Qualifying Metric Values, SQMVs, are achieved using the code described herein as executed using MATLAB Version 7.5.0.342 and the Image Processing Toolbox Version 6.0 by The MathWorks, Inc. All of the examples shown herein were written and executed using MATLAB Version 7.5.0.342 and the Image Processing Toolbox Version 6.0 by The MathWorks, Inc. The specific qualifying metric value (SQMV) is calculated from the following algorithm:

a. Define a relative overlap function for two numbers, RO(A,B) as for max(A,B)>0, RO(A,B)=min(A,B)/max(A,B)

for max(A,B)=0, RO(A,B)=1 b. The matchup target numerical image (MTNI) and potential matchup comparison numerical image (PMCNI) of a matchup pairing are, respectively, transformed to form a 32 color derivative matchup target numerical image (DMTNI) and a 32 color derivative comparison numerical image (DPMCNI) using the Matlab function rgb2ind, whereby the 32 colors are evenly distributed over RGB color space as computed by the Matlab function colorcube.

c. The histograms of the DMTNI and DPMCNI are computed as the Target Histogram (TH) and Comparison Histogram (CH), where $TH_i$ and $CH_i$ represent the number of counts in the i'th bin, wherein there is one bin for each of the 32 colors, using the Matlab function imhist.

d. The TH and CH are each normalized by dividing each bin by the total number of counts in all bins of the histogram to yield $NTH_i$ and $NCH_i$, respectively:

$$NTH_i = TH_i / \sum_{i=1}^{32} TH_i$$

$$NCH_i = CH_i / \sum_{i=1}^{32} CH_i$$

e. The Color Overlap (CO) is calculated by summing the minimum values for each bin combination of $NTH_i$ and $NCH_i$:

$$CO = \sum_{i=1}^{32} \min(NTH_i, NCH_i)$$

f. For each color (i) in the DMTNI and DPMCNI, a transform is applied yielding $DMTNI_i$ and $DPMCNI_i$ where $DMTNI_i$ and $DPMCNI_i$ represent corresponding derivative numerical images containing only the i'th color, such that there are a total of 32 $DMTNI_i$ and 32 $DPMCNI_i$.

g. For each $DMTNI_i$ and $DPMCNI_i$ label isolated connected components, commonly referred to as BLOBS using the Matlab function bwlabel and compute the following statistics:

1. $NTP_i$, $NCP_i$, the number of BLOBs in $DMTNI_i$ and $DPMCNI_i$, respectively;
2. $MATP_i$, $MACP_i$, the average of the area of all BLOBs in $DMTNI_i$ and $DPMCNI_i$, respectively;
3. $ALTP_i$, $ALCP_i$, the Area of the Largest BLOB in $DMTNI_i$ and $DPMCNI_i$, respectively.

h. The Particle Statistics Overlap for the i'th color ($PSO_i$) is calculated as:

$$PSO_i=(RO(NTP_i,NCP_i)+RO(MATP_i,MACP_i)+RO(ALTP_i,ALCP_i))/3$$

i. The Mean Particle Statistics Overlap (MPSO) is calculated as $$MPSO = \sum_{i=1}^{32} PSO_i / 32$$

j. The derivative target edge numerical image, DTENI, and the derivative comparison edge numerical image, DCENI, are computed by first converting MTNI and PMCNI to their respective grayscale images, BWTNI and BWCNI using the Matlab function rgb2gray and then applying the Canny edge algorithm as implemented by the Matlab function edge.

k. The target edge ratio, TER and comparison edge ratio, CER are computed as the ratio of the total areas of the edges of the BWTNI and BWCNI, and the total areas of their numerical images, respectively.

l. The edge ratio overlap, ERO is computed as RO(TER, CER)

m. The qualifying metric value SQMV is then computed as:

$$SQMV=(CO+MPSO+ERO)/3.$$

This and the immediately following paragraphs further describe the terms used in the definition of the Specific Qualifying Algorithm and the Specific Qualifying Metric Value. The "relative overlap function," interchangeably "RO (A,B)," is utilized numerous times in the SQ Algorithm to compare two numbers, one of which is related to the matchup target numerical image, MTNI, of a matchup pairing, and the other of which is related to the potential matchup comparison numerical image, PMCNI, of that same matchup pairing.

It is further noted that, when a transform operates upon one color numerical image to form another color NI, the language used herein to describe how the transform changes the first color NI into the second will typically reflect what would be observed visually for the linked viewable images of each.

In an illustrative example of the how the relative overlap function is used in the SQ Algorithm, "A" is selected to be the occurrence of particles in $DMTNI_i$ (i.e., "A"=$NTP_i$, the number of particles in $DMTNI_i$) and "B" is selected to be the occurrence of particles in $DPMCNI_i$ (i.e., "B"=$NCP_i$, the number of particles in $DPMCNI_i$), and the values of A and B are, respectively, 0.4 and 0.1. The minimum value for the values of A and B, min(A,B), is then 0.1, while the maximum value, max(A,B), is 0.4. RO(A,B) is then min(A,B)/max(A,B)=0.25. If, instead, both A and B are equal to the same non-zero value, for example 0.4, both min(A,B) and max(A,B) are the same and equal to 0.4, and RO(A,B) equals exactly one, indicating complete overlap for the occurrence of particles in the two numerical images for color "i." It is further instructive to note that if max(A,B) is exactly zero, then min(A,B) must be exactly zero. In this case for which A and B are identically exactly zero, the occurrence of particles in the two numerical images for color "i" is again the same for both images such that RO(A,B) is assigned a value of exactly one.

When either a matchup target NI or a potential matchup comparison NI (PMCNI) is transformed into its corresponding 32 color derivative numerical image, DMTNI and DPMCNI, respectively, the 32 colors are evenly distributed across RGB color space. The assignment of any given color to a specific bin of the 32 possible color bins is made according to the Matlab Image Processing Toolbox function rgb2ind. The 32 colors to which all colors are converted by Matlab Image Processing Toolbox function rgb2ind are listed in Table A. The numbers 0 to 1 for each of the colors red, green, and blue represent intensities, with "0" indicating no contribution from a the color and "1" indicating maximum contribution.

TABLE A

RGB coordinates for the 32 colors evenly distributed across RGB color space.[a]

| i of ith Bin | Red | Green | Blue |
|---|---|---|---|
| 1 | 0.5 | 0.5 | 0 |
| 2 | 0.5 | 1 | 0 |
| 3 | 1 | 0.5 | 0 |
| 4 | 1 | 1 | 0 |
| 5 | 0 | 0.5 | 0.5 |
| 6 | 0 | 1 | 0.5 |
| 7 | 0.5 | 0 | 0.5 |
| 8 | 0.5 | 1 | 0.5 |
| 9 | 1 | 0 | 0.5 |
| 10 | 1 | 0.5 | 0.5 |
| 11 | 1 | 1 | 0.5 |
| 12 | 0 | 0.5 | 1 |
| 13 | 0 | 1 | 1 |
| 14 | 0.5 | 0 | 1 |
| 15 | 0.5 | 0.5 | 1 |
| 16 | 0.5 | 1 | 1 |
| 17 | 1 | 0 | 1 |
| 18 | 1 | 0.5 | 1 |
| 19 | 0.333333 | 0 | 0 |
| 20 | 0.666667 | 0 | 0 |
| 21 | 1 | 0 | 0 |
| 22 | 0 | 0.333333 | 0 |
| 23 | 0 | 0.666667 | 0 |
| 24 | 0 | 1 | 0 |
| 25 | 0 | 0 | 0.333333 |
| 26 | 0 | 0 | 0.666667 |
| 27 | 0 | 0 | 1 |
| 28 | 0 | 0 | 0 |
| 29 | 0.25 | 0.25 | 0.25 |
| 30 | 0.5 | 0.5 | 0.5 |
| 31 | 0.75 | 0.75 | 0.75 |
| 32 | 1 | 1 | 1 |

[a]Color assignments are made according to Matlab Image Processing Toolbox function rgb2ind.

A "target histogram," interchangeably "TH," is computed for the derivative matchup TNI, wherein there is an "i'th bin" for each of the 32 colors of the derivative matchup TNI, and wherein $TH_i$ is the number of "counts" in the i'th bin of the target histogram. The target histogram (TH) is, further, normalized to form the "normalized target histogram," interchangeably "NTH," wherein $NTH_i$ is the number of counts in the i'th bin divided by the sum of the counts in all 32 bins. It is further noted that a target histogram or normalized target histogram may function as a target numerical descriptor be used as part of a calculation of a target numerical descriptor.

A "comparison histogram," interchangeably "CH," is computed for the derivative potential matchup CNI, wherein there is an i'th bin for each of the 32 colors of the derivative potential matchup CNI, and wherein $CH_i$ is the number of counts in the i'th bin of the comparison histogram. The comparison histogram (CH) is, further, normalized to form the "normalized comparison histogram," interchangeably "NCH," wherein $NCH_i$ is the number of counts in the i'th bin divided by the sum of the counts in all 32 bins. It is further noted that a comparison histogram or normalized comparison histogram may function as a comparison numerical descriptor be used as part of a calculation of a target numerical descriptor.

The "mean color overlap," interchangeably "MCO," is the sum of $RO(NTH_i, NCH_i)$ divided by 32, which is the total number of color bins. The mean color overlap is an indication of the extent to which the distribution of color among the 32 bins of the target histogram is similar to the distribution of color among the 32 bins of the comparison histogram. It is further noted that any of the overlap calculations may be used as a numerical similarity calculation or as a portion of a numerical similarity calculation.

The SQ Algorithm further characterizes the number of BLOBs in each of the 32 $DMTNI_i$ and 32 $DPMCNI_i$, respectively, wherein "BLOB" is an acronym for "binary large object," interchangeably "particle." Herein, a BLOB, or particle, is a contiguous area of a $DMTNI_i$ or a $DPMCNI_i$, wherein all portions of that contiguous area contain the "ith" bin color. $NTP_i$ and $NCP_i$, then, are the number of BLOBs ("number of particles") in $DMTNI_i$ and $DPMCNI_i$, respectively. $MATP_i$ and $MACP_i$, are the average of the area of all BLOBs ("mean area of particles") in $DMTNI_i$ and $DPMCNI_i$ respectively. $ALTP_i$ and $ALCP_i$ are the Area of the Largest BLOB ("area of largest particle") in $DMTNI_i$ and $DPMCNI_i$ respectively. Relative overlaps (RO) are calculated in all three of these categories. Then, a Particle Statistics Overlap (PSO) is calculated, based upon an equal weighting of the three particle-descriptive overlaps:

$PSO_i=(RO(NTP_i,NCP_i)+RO(MATP_i,MACP_i)+RO(ALTP_i,ALCP_i))/3$.

The SQ Algorithm further calculates the extent to which edges occur in the matchup TNI and the matchup CNI of a matchup pairing by first calculating the respective grayscale numerical images BWTNI ("black and white TNI") and BWCNI (black and white CNI), and then calculating, respectively a DETNI ("derivative edge TNI"), and DECNI ("derivative edge CNI").

The method of the present invention may optionally include, for the step of choosing one or more comparison linked numerical image from one or more comparison LNI set to be a matchup comparison numerical image, a game play constraint wherein that game play constraint is a "matchup CNI constraint." In this example, the matchup CNI constraint is that any comparison LNI chosen to be a matchup comparison NI has an SQMV within a specified SQMV inclusion range when compared with every matchup target NI, taken one matchup TNI at a time. For this matchup CNI constraint, there is no further step of actually calculating an SQVM using the SQ Algorithm, because the constraint is simply that, if an SQMV were calculated for the matchup CNI for each matchup pairing with each matchup TNI, all of those SQMV would, by definition, fall within whatever SQMV inclusion range has been specified. If, for example, the SQMV inclusion range is a range of SQMV from at least zero to no more than 0.950, then any comparison linked numerical image having an SQMV greater than 0.95, when paired with any of the matchup TNI, would not be a comparison LNI of the step of choosing, and by default could not be a matchup CNI. In this way, the existence of an explicit SQ Algorithm allows scrutiny of any matchup pairing to assess the similarity of the potential matchup CNI of that pairing to the matchup TNI of that pairing, as an inherent property of the former relative to the latter.

Because the full range of possible SQMV extends continuously from at least exactly zero to no more than exactly one, "SQMV inclusion ranges" may span any portion, but not all, of that full range, and may be continuous or discontinuous. For example, the present invention contemplates SQMV inclusion ranges of exactly zero to no more than 0.999 and at least 0.001 to exactly one. Further contemplated are these exemplary, inclusive and combinable, range extrema: exactly zero, at least 0.005, at least 0.01, at least 0.05, at least 0.1, or at least 0.2; and no more than 0.995, no more than 0.99, no more than 0.95, no more than 0.9, no more than 0.8, no more than 0.7, or no more than 0.5. Also contemplated are these exemplary, inclusive and combinable, range extrema: at least 0.8, at least 0.9, at least 0.95, at least 0.99, or at least 0.999; and no more than exactly 1.

Non-limiting examples of other matchup CNI constraints, further include constraints on number of matchup CNI. Non-limiting examples of a matchup TNI constraint are constraints on number of matchup TNI, such as: there must be a single matchup TNI, there must be more than one matchup TNI, or that the matchup TNI must have a particular characteristic.

A "viewable image," interchangeably "VI," of the present invention is an image rendered from a numerical image through the intermediacy of an "image-rendering device," and capable of being observed visually by a player having visualization capability. Non-limiting examples of viewable image include: a displayed image on a computer monitor; a projected image from a computer based projector, and a printed page from a computer based printer. A viewable image may function, for example, to provide players a means to monitor and assess the progress of game play, and to generally interact with computer hardware and software to influence the progress of game play. It will be recognized that, while access to a viewable image may often be very helpful to a human player, the viewable image acting as a proxy for a member of the numerical image from which it has been rendered, there may be cases in which the rendering of a numerical image to form a viewable image is not necessary for game play to proceed. An example of play in which the presence of any viewable image may be optional, or completely unnecessary, is play involving only computer-resident players. A computer-resident player may not require access to any viewable image as a means to monitor and influence game play, although a computer-resident player equipped with visualization capability could potentially benefit from such access in certain cases. In fact, a computer-resident player that is resident on a computer other than that hosting the numerical images necessary for game play, and having no network access to those numerical images, might require both access to a viewable image and a means to view that image in order to participate in game play. It is also within the scope of the present invention that a viewable image constraint will be included in a round of game play wherein, for example, such constraint is included to increase or decrease the degree of difficulty of that round.

Viewable images may typically be formed by rendering of a variety of numerical images, provided those numerical images are color numerical images. Such numerical images include: germinal NI, members of a target LNI set, members of a comparison LNI set, matchup TNI, potential matchup CNI, and matchup CNI. It is further noted that the germinal numerical images of a germinal numerical image library may be either color NI and therefore renderable to form a viewable image, or colorless NI and therefore not directly renderable to a VI. It is similarly true for the target linked numerical images of a TLNI set, and for the comparison linked numerical images of a CLNI set, that the various TLNI and CLNI may or may not be color NI. By contrast, it is a requirement that any matchup TNI and any matchup CNI must be color NI. In addition, the method of the present invention contemplates embodiments in which a target numerical descriptor may be calculated from more than one matchup TNI, or a comparison numerical descriptor may be calculated from more than one matchup CNI, or both. It may, optionally, be the case that, when a numerical descriptor is calculated based on multiple matchup TNI or multiple matchup CNI, an NI merging transform will operate upon the multiple NI to form a "merged MTNI" or "merged MCNI," respectively. In such case, any of the merged MTNI and merged MCNI could be rendered to form a linked viewable image.

When a viewable image is formed by rendering from a linked numerical image of a linked numerical image set, that viewable image may further alternatively be termed a "linked viewable image," interchangeably "LVI," to indicate that it originated from that specific linked numerical image set.

A viewable image rendered from a target linked numerical image may further be termed a "target linked viewable image" ("target LVI," "TLVI"). A viewable image rendered from a comparison linked numerical image may further be termed a "comparison linked viewable image" ("comparison LVI," "CLVI").

An "image-rendering device" is a device capable of converting a color numerical image into a "viewable image" by: converting color information contained in a color NI into a viewable image.

Herein, the process of converting a color numerical image, into a viewable image through the intermediacy of an image-rendering device is termed "rendering." It is understood that the hardware configuration and software algorithms of an image-rendering device will be designed to convert the information contained in the color NI into a viewable image. Of course, there may be members of a linked numerical image set that are colorless numerical images having a function relative to the conduct of game play other than the formation of a viewable image. Further, the specifics of any particular round of game play might not call upon a particular color NI to be rendered to form a viewable image, or might even stipulate that certain color NI not be rendered to form viewable images. It is still further understood that there could be a situation in which a rendering device has the capability of accepting as input a colorless numerical image and then transforming that colorless NI into a color NI prior to, or simultaneously with, formation of a viewable image from that internally generated derivative color NI. In the method of the present invention, that internally generated derivative color NI is considered to also be a linked numerical image of the linked numerical image set that has as a member the input colorless NI.

Whereas a numerical element is the fundamental unit of a numerical image, a "pixel" is the fundamental unit of a viewable image. More specifically, a pixel is the smallest addressable element of a display of an image-rendering device. When a color numerical image is converted to a viewable image by an image-rendering device, all or some portion of the numerical elements of that linked numerical image are referenced by the hardware and software of the image-rendering device to form that viewable image. One skilled in the digital image rendering art will recognize that a pixel of the display of an image-rendering device will have a specific construction, composition, and spatial relationship to other pixels of that image-rendering device. Moreover, the state of any given pixel will be determined by referencing, by computer hardware and software, of one or more numerical element of the color NI. Based upon the one or more numerical element referenced, the state of the pixel is determined such that the pixel exhibits a specific intensity of a specific color. Typically, but not necessarily, the color to be exhibited by a given pixel will be communicated to pixel control hardware as intensity. In a non-limiting example, a pixel may be constructed of a red sub-element, a green sub-element, and a blue sub-element. In this RGB example, an intensity is communicated for each pixel sub-element such that, contingent upon sufficient nearness to each other and distance from the observer, the three emitted colors combine in proportions dictated by the relative intensities of their corresponding sub-pixels to create a composite color perceived by the observer. In like manner, a pixel is the most basic unit of a viewable image as rendered by a rendering device. As a practical matter, it is a requirement that any matchup target NI and any matchup comparison NI of the present invention must be a color NI so that the matchup target NI or matchup comparison NI is capable of being rendered by a rendering device to form a viewable image. In that way, any of the matchup target NI and matchup comparison NI can be rendered into a form (i.e., a viewable image) that is tangible to any player having the requisite visual capability, and that is further tangible as a specific condition or state of a rendering device. As such, each viewable image can be seen and visually compared with other viewable images.

Beyond matchup target NI and matchup comparison NI, any member of a target LNI set or a comparison LNI set that is a color NI, or any potential matchup CNI, or any merged MTNI or merged MCNI that may be formed during calculation of their respective numerical descriptors, is capable of being rendered to form a tangible viewable image, as well as a tangible condition or state within a rendering device. Likewise, a germinal NI that is also a color NI is capable of being rendered to form a tangible condition or state in a rendering device such that a viewable image linked to that germinal NI can be formed as a tangible entity.

When a germinal numerical image is a colorless numerical image, construction of a linked numerical image set from that germinal numerical image includes population of that linked numerical image set with one or more linked numerical images, at least one of which is a color NI containing color information assigned, according to a rational color assignment scheme, by the operation of one or more transform operating in a specified order. For example, a germinal numerical image having no color information whatsoever could contain information on the locations and accident records of all ships having tonnage above a certain weight. A transform could then operate upon that germinal numerical image to convert it to a derivative linked numerical image containing color information by converting numerical elements describing accident records to numerical elements containing assigned color information, such that, for example, the derivative linked numerical image could be rendered to form a viewable image wherein the oceans of the world are covered with dots indicating the current locations of all ships having tonnage over a certain weight, and wherein the color of each dot corresponds to the safety record of the corresponding ship. If information regarding country of registration were also available as a type of numerical element in the colorless NI, an additional transform could be made to operate upon that germinal numerical image to form another derivative linked numerical image limited to, for example, Liberia registered ships such that a viewable image could be formed affording the viewer a color based impression of the accident record of Liberia registered ships, along with the global distribution of those ships.

It is further understood that "pre-digital information" regarding, for example, a pre-digital information source that is a scene in nature, or a scene including an artificial object, or some combination of the two, may be gathered using frequencies of the electromagnetic spectrum other than those of the visible spectrum, such as sound, microwave, infrared, ultraviolet, magnetic, gamma-ray and X-ray frequencies, and that any of these frequencies, or combination of these frequencies, could be utilized and are envisioned by the present invention. A numerical image including information gathered in this way will often, but not necessarily, be a colorless NI, yet be eligible to be a germinal numerical image. For example, if an infrared camera had been utilized to sample a pre-digital information source and thereby generate a colorless germinal NI, a linked numerical image set constructed based on that colorless germinal NI might well include linked numerical images containing information related to infrared frequencies, often as a narrow band of frequencies or a single frequency. In order to be a useful resource for providing matchup target NI and matchup comparison NI, that LNI set must contain at least one color LNI as a linked numerical image. Such color LNI can be generated through the operation of one or more colorizing transforms.

Of course, it is very common to gather information regarding a pre-digital information source, wherein that gathering relies upon the frequencies of visible light, using a digital still camera or digital motion picture camera to form one or more numerical image suitable for use as a germinal numerical image. A numerical image could, of course, include information gathered using frequencies from both the visible spectrum and the non-visible spectrum.

The linked numerical images of a linked numerical image set may be related to one another in any way possible through the operation of one or more transform upon the germinal numerical image for that set. For example, a linked numerical image set might include a linked numerical image emphasizing the intensity of the color red sampled from a germinal numerical image that is a color NI. Another LNI emphasizing the intensity of the color green, and yet another LNI emphasizing the intensity of the color blue might also be transformed from that same GNI. Here, each of these derivative linked numerical images in that linked numerical image set is related, and therefore linked, in that it is an alternative color representation based upon color information contained in the germinal numerical image. Additionally, each of these three derivative linked numerical images may be rendered to its respective viewable image independently, or may be combined, using one or more appropriate transforms, into a single linked numerical image (e.g., an RGB, RG, RB, GB, or gray-scale image) that may be rendered to form a viewable image.

As part of playing the game of the present invention, a player directs the course of game play by issuing a "player directive" when presented with options for proceeding with game play. A player directive can be indicated by a human player to computer hardware and software by any available means by way of a "human machine interface" ("HMI"). A non-exhaustive list of ways by which a player may use an HMI includes: manipulating a mouse or other pointing device; manipulating a joystick type device; gesturing, such as tapping and swiping where a finger is in contact with a touch sensitive screen or a keyboard; gesturing at a distance from the computer and its peripheral devices, detectable by a remote sensing device; vocalizing, translated by a voice sensing device; eye moving monitored by a gaze point sensing device; bio-electronically stimulating a bio-electronic monitoring device; and issuing of any other types of player directive that can be monitored by pertinent accessible HMI technologies. It is further understood that a computer-resident player can issue a player directive by way of the hardware and software upon which it is resident and, additionally, by way of any peripheral HMI hardware and software having capability of functioning to facilitate communication of a player directive issued by the computer upon which that computer-resident player resides to the computer upon which game design is implemented. Although player directives such as keyboard strokes, voice commands, and eye movement commands are typically associated with human players, and to some degree animal players, it is also within the scope of the present invention that such a player directive is issued to a directive sensing device through the intermediacy of the peripheral hardware and software having the capability of functioning to facilitate communication of player directives issued by a computer-resident player.

It is a requirement of the method of the present invention that at least one player will make at least one player choice (e.g., issue at least one player directive) during game play. The extent to which a player will participate in influencing how any step of the method of the present invention will proceed will vary according to the specific details of overall game design, constraints applied to a specific round according to game design, constraints applied to a specific round according to player choice, and specific decisions made by a player during game play within the boundaries of overall game design and specific game play constraints. "Game design" is the structure of game play according to the method of the present invention, providing the framework within which all rounds of game play are created and executed. Game design is implemented according to hardware and software design. When confronted with player choices, what the player actually chooses, communicated through the issuing of player directives, determines how pertinent steps of the method of the present invention proceed within that customized environment for any round of game play. Therefore, the steps of providing a germinal numerical image library, providing germinal numerical images to that library, constructing a target linked numerical image set, constructing a comparison linked numerical image, constraining game play, and options for directing game play are governed by game design and, to a greater or lesser degree, by player directive indicating player choice. A customized environment of a round of game play heavily weighted toward restricting player participation will typically be structured so that the constraints upon the player, and therefore upon the opportunities a player will have to influence how the steps of the method of the present invention proceed by issuing player directives, will be many. A game design featuring relatively greater opportunity for a player to influence how the steps of the method of the present invention proceed by issuing player directives will, correspondingly, present the player with more choices.

In its simplest form, a "round of game play," interchangeably a "round," begins with selecting one or more germinal numerical image (from the provided germinal numerical library) and ends with the calculating of a single numerical score. When steps of the method of the present invention are repeated or multiple numerical scores are calculated during a round of game play, the terminating of a round of game play may be signaled by the achievement of an "outcome." A non-exhaustive list of outcomes includes: attaining one or more numerical scores; the elapsing of a certain time period; attaining a certain numerical score threshold; completing a set of activities specified by game design for the round of game play; and prematurely terminating a round for any reason. "Pausing," that is, temporarily disengaging from play during a round of game play, while a common occurrence due, for example, to distractions outside of game play and to waiting for other players to respond, is not considered to be an outcome. Upon completion of one round of game play, another round may be played based upon game design and player choice. For example, game constraints consistent with changing the level of game play could be applied for the next round. Alternatively, the next round could be played without changing level of game play, but instead by selecting new germinal numerical images, or making different player choices within the game play constraints of that same level.

The term "visual system" is well known to one of ordinary skill in the art of vision physiology. For a human, the physiological components of the "visual system" include, for example, lens of the eye, other essential eye components, retina, nerves, and portions of the brain used in visual processing and storage. A fully functional visual system is capable of translating a viewable image into a "neurological visual impression" within the brain, through the processing of visible light associated with that viewable image.

A player may utilize the player's visual system to perceive a viewable image through the intermediacy of visible light unaided by any visual augmentation device. If, however, the human player possesses a defective visual system or wishes to enhance his or her visual capability, a "visual augmentation system" may be added. A visual augmentation system may include a visual augmentation device that enhances the capability of a visual system to translate a viewable image into a neurological visual impression. This visual augmentation may occur by addition to the visual system, circumvention of all or part of the visual system, or some combination of the two. Such augmentation may, for example, be implemented to correct a small or large defect in some portion of the visual system (e.g., near-sightedness, far-sightedness, partial blindness, total blindness, color blindness, depth perception, brightness hypersensitivity, or contrast insensitivity), to enhance performance beyond what a normal visual system is capable of delivering, or to deliver an impression of the viewable image to the observer's brain by way of a delivery path that differs from the normal biological path of the human visual system.

Well-known visual augmentation systems non-exhaustively include: the non-contact lenses of ordinary glasses; contact lenses; lens implants; magnifying glasses; optical microscopes; and optical telescopes. However, the present invention envisions implementation of any available visual augmentation system to enhance perception of the viewable image. Those visual augmentation systems, then, further and non-exhaustively include any implant or otherwise interfaced device that enhances the clarity of light that is gathered from a viewable image, as well as any implant or otherwise interfaced device that enhances creation, storage, or interpretation of a neurological visual impression within the brain.

The present invention contemplates using the method for: participating in solitary, non-competitive, competitive, or collaborative game play; training to improve color manipulation skills; creating of new artwork; analyzing color data; analyzing colorless data; facilitating visual design; facilitating non-visual design; training to improve color visualization skills; determining how closely two pieces of motion picture footage are related; improving memory skills; improving cognitive skills; improving language skills (e.g., Chinese character recognition); and cataloging.

Table B provides non-limiting examples of how constraints may be set to provide boundaries and options for game play within the method of the present invention. Exemplary patterns illustrate how constraints may be set for various constraint types. For the purpose of illustration, these constraint patterns will be described as though they obtain throughout a round of game play and, in fact, they often do. However, there is no particular limit upon whether a constraint pattern obtains for an entire round or just a portion of a round.

TABLE B

Exemplary Constraint Patterns Set For A Round Of Game Play.

| Constraint Type, Pattern | Constraint Category | Constraints |
|---|---|---|
| Numerical Image | | |
| GNI | | |
| Pattern A | GNI# | #TLNI originators = 1; #CLNI originators = 1 |
| Pattern B | GNI#; ID | #TLNI & #CLNI orig. = 1; $ID_T = ID_C$ |
| Pattern C | GNI#; ID | #TLNI orig. = 1; #CLNI orig. ≥ 2; $ID_T \neq ID_C$ |
| Pattern D | GNI color status | TLNI & CLNI originators = color only |
| Pattern E | GNI color status | TLNI & CLNI originators = colorless only |
| TLNI | | |
| Pattern F | none | none |
| Pattern G | #(color)TLNI/GNI; GNI subdivision | #(colorNI) = 9/GNI; symmetrical |
| Pattern H | #(color)TLNI/GNI; GNI subdivision | #(colorNI) ≥ 4/GNI; unsymmetrical |
| CLNI | | |
| Pattern I | #(color)CLNI/GNI; GNI subdivision | #(colorNI) ≥ 16; random |
| Pattern J | GNI color manipulation | angular shift vs. GNI = 30° clockwise |
| MTNI | | |
| Pattern K | total# of MTNI | total# = 9 |
| Pattern L | total# of MTNI | 4 ≤ total# ≤ 16 |
| MCNI | | |
| Pattern M | total# MCNI; GNI color mod; reuse | # ≥ 8; GNI complement only; reuse ≥ 2 MCNI |
| Pattern N | comparing; reuse | MCNI merge = 3; no reuse of MCNI |
| Viewable Image | | |
| Originating NI | | |
| Pattern O | color NI display | color GNI, TLNI, CLNI must display |
| Pattern P | color NI display | color GNI, MTNI, MCNI must display |
| Pattern Q | color NI display | Prohibit display of TLNI, CLNI, MTNI, MCNI |
| Pattern R | VI source: view time; opacity profile | MTNI: 2 min; linear fade 100% to 0% |
| Time | | |
| Pattern S | round time limit; player choice | 1 min ≤ t ≤ 5 min; player chooses time limit |
| Pattern T | round time limit; score variation | 4 minute maximum; non-linear penalty increase |
| Pattern U | round time limit; score variation | 6 minute maximum; linear bonus decrease |
| Transform Type | | |
| Pattern V | GNI → CLNI design option; type # | only color manipulation types; player picks 2 types |
| Pattern W | GNI → CLNI design option; reuse | require color comp, color shift; reuse ea. 1 to 6 |
| Transform Seq. | | |
| Pattern X | design based order | color manipulation transforms operate first |
| Pattern Y | design based order | subdivision > color manip. > texture > logical |
| QMV incl. range | | |
| Pattern Z | QMV (full range is 0% to 100%) | pot. MCNI qualify if 0 ≤ QMV ≤ 80% of full range |
| Pattern AA | QMV (full range is 0% to 100%) | pot. MCNI qualify if 5 ≤ QMV ≤ 50% of full range |

TABLE B-continued

Exemplary Constraint Patterns Set For A Round Of Game Play.

| Constraint Type, Pattern | Constraint Category | Constraints |
| --- | --- | --- |
| SQMV incl. range | | |
| Pattern AB | SQMV(full range is 0 ≤ 1) | pot. MCNI qualify if 0 ≤ SQMV ≤ 0.995 of full range |
| Pattern AC | SQMV(full range is 0 ≤ 1) | pot. MCNI qualify if 0 ≤ SQMV ≤ 0.95 of full range |
| Pattern AD | SQMV(full range is 0 ≤ 1) | pot. MCNI qualify if 0 ≤ SQMV ≤ 0.50 of full range |

Constraint Pattern A constrains the number of germinal numerical images (GNI) that may be selected to originate target LNI sets and comparison LNI sets to one for both. Pattern B adds the further constraint that the two GNI must be identical, while Pattern C requires that the GNI selected to originate the TLNI set (i.e., TLNI originators) not be identical to any GNI selected to originate a CLNI set (i.e., CLNI originators). Patterns D and E require that all selected GNI must be color NI or colorless NI, respectively.

In Pattern F, no constraint has been placed upon the target LNI, while Patterns G and H require a specific number of color TLNI per originating GNI, and specify how subdivision (symmetrical for G; unsymmetrical for H) of that originating GNI should be done to form the color TLNI. While Patterns G and H each specify one specific number of TLNI into which an originating GNI must be subdivided, it is further understood more generally that a numerical image constraint specifying subdivision of a GNI into one or more linked numerical images may specify ranges for the number of such LNI. As a non-limiting example, the ranges specified could include these inclusive and combinable extrema: at least one; at least 2; at least 3; at least 4; at least 9; or at least 16; and no more than 1024; no more than 512; no more than 256; or no more than 128. In other non-limiting examples, at least two LNI, or at least four LNI might be specified with no upper limit to the number of LNI.

Pattern I constrains number of CLNI per GNI and specifies random subdivision of the originating GNI, while Pattern J requires that the position of the color in the CLNI be shifted clockwise by 30 degrees, based on a rotation about a center point of the original GNI. Here, the color shift refers to the shift in color position that would be observed between the viewable image linked to the GNI and the viewable image linked to any of the CLNI members of the CLNI set derived from that GNI.

Patterns K and L set the total number of TLNI that can be assigned to be matchup target NI for the purpose of comparing with matchup CNI. Pattern M constrains the total number of matchup comparison NI to at least 8, requires that each MCNI be the complement of the colors of the portion of the GNI from which it was derived, and requires reuse of at least 2 MCNI during comparing with assigned MTNI. Pattern N requires that, for purposes of comparing with any assigned MTNI, three MCNI must be merged during the comparing, and there must further be no reuse of MCNI.

Constraints upon the viewable images (VI) that are associated with the various color NI provide opportunities for players having visual capability to monitor the progress of game play in ways that inform or intrigue, or both. Broadly, any color numerical image may be rendered as a viewable image and displayed on a display device to a player having visual capability. Often, however, a smaller subset of the color NI available for rendering and display will actually be made available to the player as viewable images. Therefore, viewable image constraints are quite common as a matter of game design, and sometimes as a matter of player choice. Patterns O and P both require that selected GNI linked viewable images be displayed, a requirement with important implications regarding the ability of sighted players to make decisions on selection and sequence of transforms and consequences of transform operation upon the GNI. For Pattern O, the color TLNI and color CLNI must also be displayed. For Pattern P, the color GNI, the MTNI and the MCNI must also be displayed. In contrast, Pattern Q heightens the degree of difficulty as well as the intrigue of game play by requiring that the all color target and comparison NI be plunged into darkness. Pattern Q "flying blind" constraints, for example, force a sighted human player to predict the consequences of his or her actions absent verification. In this way the method of the present invention envisions fiercely competitive rounds in which, at certain times during a round, each player may invoke one or more view image prohibiting constraints upon a competitor or upon him or herself. Pattern R constrains the linked VI of any matchup target NI to be visible for 2 minutes, and sets the opacity profile for that linked VI to be a linear fade from 100% to 0% over that 2 minute period, such that one effect may be high anxiety on the part of a player forced to increasingly rely on memory as all of the MTNI linked VI fade from sight. Of course, variations of Pattern R would include variable time periods and opacity profiles for the various MTNI linked VI.

Constraint Patterns S, T, and U constrain the time period during which a round can be played. For Pattern S, the player must choose the time period. For Patterns T and U, maximum time periods are set by game design or player choice, and an increasing penalty is assessed in a non-linear way or a decreasing bonus is granted in a linear way, respectively, dependent upon when a player actually completes the round.

Transforms are typically used at multiple points in the steps of game play. For Pattern V, game design presents the player with options for transforming germinal NI into comparison LNI, and the player must choose exactly two types of color manipulation transform. For Pattern W, game play design presents the player with options for transforming germinal NI into comparison LNI. One constraint is that color manipulation transform types for color complement and color shifting must be used, but other transform types are also allowed. Further, each transform must be reused 1 to 6 times (for a total of 2 to 7 uses) during the round.

Depending on game design, the sequence in which transform types, or even specific transforms, can operate relative to other transforms may be unconstrained or constrained in some way. For Patterns X and Y, game design presents the player with constraints for the order in which transforms can operate to transform germinal NI into comparison LNI. For Pattern X, all color manipulation transforms must operate first in any sequence of transform operation. For Pattern Y, the transform types must operate in a specific order: subdivision→color manipulation→texture→logical.

The method of the present invention envisions rounds of game play wherein it is desired to place constraints upon how closely a matchup comparison NI may resemble any matchup target NI with which it may be compared. Any Qualifying Algorithm (Q Algorithm) may be used to determined whether a given potential matchup CNI qualifies to be included as an actual matchup CNI, provided that Q Algorithm calculates qualifying metric values (QMV) reflective of the degree of resemblance. Hence, optional selection of a Q Algorithm is a matter of game design, with or without player input. Pattern Z and AA constraints are based upon QMV inclusion ranges that themselves cover a portion of the full range of all possible QMV values. For Patterns Z and AA, potential MCNI that have been chosen from one or more CLNI sets are qualified according to two different QMV inclusion range constraints, respectively: $0 \leq QMV \leq 80\%$ of full range; and $5 \leq QMV \leq 50\%$ of full range.

The present invention contemplates computer implemented method for an image construction game, the method including: at a computer system including one or more processors and memory storing one or more programs, the one or more processors executing the one or more programs, performing the steps of:
  A. providing a germinal numerical image library including one or more germinal numerical image, wherein each germinal numerical image is a numerical image that is: available to initiate constructing of a linked numerical image set, through forming of one or more linked numerical image, wherein the linked numerical image is derived from the germinal numerical image through the operation of one or more transform operating in a specified order, and wherein a transform is a mathematical operation capable of transforming one numerical image into another numerical image;
  B. constructing a target linked numerical image set, the constructing the target LNI set including the steps of: selecting one germinal numerical image; and populating the target linked numerical image set with one or more target linked numerical image, at least one of which is a color numerical image, and each of which is formed by the further steps of: specifying one or more transform; specifying an order in which the one or more transforms are to operate upon the germinal numerical image to form the target linked numerical image; and forming the target linked numerical image through the operating, upon the germinal numerical image, of the one or more transform in the specified order;
  C. constructing a comparison linked numerical image set, the constructing the comparison LNI set including the steps of: selecting one germinal numerical image; and populating the comparison linked numerical image set with one or more comparison linked numerical image, at least one of which is a color numerical image, and each of which is formed by the further steps of: specifying one or more transform; specifying an order in which the one or more transforms are to operate upon the germinal numerical image to form the comparison linked numerical image; and forming the comparison linked numerical image through the operating, upon the germinal numerical image, of the one or more transform in the specified order;
  D. assigning one or more target linked numerical image from one or more target linked numerical image set to be a matchup target numerical image, wherein the target linked numerical image is a color numerical image;
  E. choosing one or more comparison linked numerical image from one or more comparison linked numerical image set to be a matchup comparison numerical image, wherein the comparison linked numerical image is a color numerical image;
  F. comparing one or more matchup comparison numerical image with one or more matchup target numerical image, wherein the comparing includes the steps of: calculating a target numerical descriptor, based on the one or more matchup target numerical image; calculating a comparison numerical descriptor, based on the one or more matchup comparison numerical image; and calculating a numerical similarity, based on the comparison numerical descriptor and the target numerical descriptor;
  G. calculating a numerical score, based on one or more numerical similarity.

The method of the present invention contemplates that a germinal numerical image is derived from: a digital information source, a pre-digital source, or combinations thereof. When at least one germinal numerical image is derived from a pre-digital information source, the at least one germinal numerical image is formed by the further step of digitizing the pre-digital information source.

The present invention contemplates a system for performing the method of the present invention wherein the system includes addressable memory, wherein the addressable memory is a non-transitory computer-readable storage medium that stores instructions for performing the method and a processor in communication with the memory, for executing the instructions.

The present invention further contemplates a system for image construction formulated as a game including: a non-transitory computer-readable storage medium wherein the storage medium includes a computer-executable program for performing the method of the present invention, and a processor in communication with the storage medium; wherein the system further includes: a germinal numerical image library; a user interface controller; a germinal numerical image library providing component for providing the germinal numerical image library; a numerical image transformation component for transforming one numerical image into another numerical image; a target LNI set construction component for constructing a target linked numerical image set; a comparison LNI set construction component for constructing a comparison linked numerical image set; a target LNI assignment component for assigning one or more target linked numerical image to be a matchup target numerical image; a comparison LNI choice component for choosing a comparison linked numerical image to be a matchup comparison numerical image; a matchup numerical image comparing component for comparing one or more matchup comparison numerical image with one or more matchup target numerical image; and a numerical score calculation component for calculating a numerical score.

The present invention further contemplates a computer-executable program stored on a non-transitory computer-readable storage medium, the program including the method of the present invention.

The present invention contemplates an image processing apparatus that has recorded in a storing section the program for the method of the present invention, the apparatus including:

A. a numerical image storing section;
B. a derivative numerical image calculator for calculating: a comparison linked numerical image from a germinal numerical image, a target linked numerical image from a germinal numerical image; and combinations thereof;
C. a numerical descriptor calculator for: calculating a target numerical descriptor, based on the one or more matchup target numerical image; and calculating a comparison numerical descriptor, based on the one or more matchup comparison numerical image;
D. a numerical similarity calculator for calculating a numerical similarity, based on the comparison numerical descriptor and the target numerical descriptor; and
E. a numerical score calculator for calculating a numerical score, based on one or more numerical similarity.

The image processing apparatus may further, optionally, include a qualifying metric value calculator for calculating a qualifying metric value according to a qualifying algorithm.

Further contemplated in the present invention is an image construction computer game method, including the steps of:
A. providing a germinal numerical image library including one or more germinal numerical image, wherein each germinal numerical image is a numerical image that is: available to initiate constructing of a linked numerical image set, through forming of one or more linked numerical image, wherein any linked numerical image is derived from the germinal numerical image through the operation of one or more transform operating in a specified order, and wherein a transform is a mathematical operation capable of transforming one numerical image into another numerical image;
B. constructing a linked numerical image set, the constructing a linked numerical image set including the steps of: selecting one germinal numerical image; and populating the linked numerical image set with one or more linked numerical image, each of which is formed by the further steps of: specifying one or more transform; specifying an order in which the one or more transforms are to operate upon the germinal numerical image to form the linked numerical image; and forming the linked numerical image through the operating, upon the germinal numerical image, of the one or more transform in the specified order;
C. assigning one or more linked numerical image from one or more linked numerical image set to be a matchup target numerical image, wherein the target linked numerical image is a color numerical image;
D. choosing one or more linked numerical image from one or more linked numerical image set to be a matchup comparison numerical image, wherein the comparison linked numerical image is a color numerical image;
E. comparing one or more matchup comparison numerical image with one or more matchup target numerical image, wherein the comparing includes the further steps of: calculating a target numerical descriptor, based on the one or more matchup target numerical image; calculating a comparison numerical descriptor, based on the one or more matchup comparison numerical image; and calculating a numerical similarity based on the comparison numerical descriptor and the target numerical descriptor;
F. calculating a numerical score based on one or more numerical similarity.

The Specific Qualifying Algorithm (SQ Algorithm) is the Qualifying Algorithm (Q Algorithm) explicitly defined hereinabove. Because the SQ Algorithm is a single explicit algorithm, the specific qualifying metric value it will calculate for any matchup pairing of a potential MCNI with an MTNI is an inherent characteristic of that matchup pairing. Pattern AB, AC, and AD SQMV inclusion range constraints increasingly require the potential matchup comparison NI of any matchup pairing to be less similar to the matchup target NI of that pairing. Pattern AB disqualifies only the identical or very nearly identical potential matchup CNIs, while Pattern AC and AD constraints are, respectively, more and much more exclusive.

Some non-limiting embodiments of the invention will now be described in the examples that follow. Those examples variously reference the figures and the detailed descriptions of the figures set forth hereinabove. Any reference to a figure, then, includes both the figure itself and the detailed description of the figure, and any reading of the examples should include a thorough review of the cited figures and the detailed descriptions thereof. Further, various pictures contained in the figures are viewable images representing the numerical images from which they have been derived and to which they are, therefore, linked. Hence, a reference to a numerical image in the examples, invites review of the viewable image representing it, whether or not explicitly stated.

Specific Qualifying (SQ) Algorithm Computer Code for Calculation of a Specific Qualifying Metric Value (SQMV) for a Matchup Pairing.

The Specific Qualifying Metric Values, SQMVs, are achieved using The computer code that immediately follows is described hereinabove, and is executed using MATLAB Version 7.5.0.342 and the Image Processing Toolbox Version 6.0 by The MathWorks, Inc. All of the examples shown herein were written and executed using MATLAB Version 7.5.0.342 and the Image Processing Toolbox Version 6.0 by The MathWorks, Inc.

The Specific Qualifying Algorithm:

```
function [CO, MPSO, ERO, SQMV] = CalcSQMV(MTNI, PMCNI)
NC = 32;
%Get 32 colors evenly distributed over RGB colorspace
pal = colorcube(NC);
%Calculate DMTNI and DPMCNI
DMTNI = rgb2ind(TNI,pal,'nodither');
DPMCNI = rgb2ind(CNI,pal,'nodither');
%Calc target and comparison histograms TH and CH
[TH, x] = imhist(DMTNI,pal);
[CH, x] = imhist(DPMCNI,pal);
%Normalize histograms
TAT = sum(TH); %Total Area Target
TAC = sum(CH); %Total Area Comparison
NTH = TH / TAT;
NCH = CH / TAC;
%Calculate Mean Color Overlap (MCO)
total_overlap = 0;
for i=1:NC
    total_overlap = total_overlap + min(NTH(i),NCH(i));
end
CO = total_overlap;
%Analyze BLOBs for each color
PSO = zeros(1,NC);
for i=1:NC
    %Isolate the i-1 color image ***Note colors are zero based
    DMTNIi = DMTNI == (i-1);
    %Label DMTNIi
    [imXL, n] = bwlabel(DMTNIi);
    imXLI = uint16(imXL);
    %Number of Target BLOBs
    NTP = n;
    if n > 0
        subArea = zeros(1,n);
        %Loop over each BLOB
        for j=1:n
```

-continued

```
        %Isolate the j'th BLOB only image *** this is a logical
        image
        imXLII = imXLI == j;
        %calculate the fractional subarea of j'th BLOB
        subArea(j) = sum(sum(imXLII))/TAT;
    end
    ALTP = max(subArea);
    MATP = mean(subArea);
else
    ALTP = 0;
    MATP = 0;
end
%Isolate the i-1 color image ***Note colors are zero based
DPMCNIi = DPMCNI == (i-1);
%Label DPMCNIi
[imXL, n] = bwlabel(DPMCNIi);
imXLI = uint16(imXL);
%Number of Comparison BLOBs
NCP = n;
if n > 0
    subArea = zeros(1,n);
    %Loop over each BLOB
    for j=1:n
        %Isolate the j'th particle only image
        imXLII = imXLI == j;
        %calculate the fractional subarea of j'th BLOB
        subArea(j) = sum(sum(imXLII))/TAC;
    end
    ALCP = max(subArea);
    MACP = mean(subArea);
else
    ALCP = 0;
    MACP = 0;
end
%Calculate PSO Particle Statistic Overlap
PSO(i) = (RO(NTP,NCP) + RO(MATP,MACP) +
    RO(ALTP,ALCP))/3;
end
%Mean Particle Statistics Overlap (MPSO)
MPSO = mean(PSO);
%Create Derivative Target Edge Numerical Image (DTENI)
BWTNI = rgb2gray(MTNI);
DTENI = edge(BWTNI,'canny');
%Compute Target Edge Ratio TER
[countsEdge, x] = imhist(DTENI);
TER = countsEdge(2)/sum(countsEdge);
%Create Derivative Camparison Edge Numerical Image (DCENI)
BWCNI = rgb2gray(PMCNI);
DCENI = edge(BWCNI,'canny');
%Compute Comparison Edge Ratio CER
[countsEdge, x] = imhist(DCENI);
CER = countsEdge(2)/sum(countsEdge);
%Compute Edge Overlap (EO)
ERO = RO(TER,CER);
%Compute Qualifying Metric Value (QMV)
SQMV = (CO + MPSO + ERO)/3;
```

Example 1

Formation of Linked Numerical Images from Germinal Numerical Images

Each of the linked numerical images represented by the viewable images of FIG. 5A was derived from one of the germinal numerical images represented by the viewable images of FIG. 4. TLNI6a is a member of the target linked numerical image set derived from GNI6, and is the result of the operation of an identity transform. Similarly, CLNI6c is a member of the CLNI set derived from GNI6 through the operation of an identity transform, while CLNI6a and CLNI6b were, respectively, derived from GNI6 through the operation a subdivision transform and a geometric transform that flipped GNI6 across a vertical axis. All three of CLNI6a, b, and c are members of the same comparison linked numerical image set because they are all derived from the same germinal numerical image, GNI6.

Example 2

Calculation of Specific Qualifying Metric Values for Potential Matchup Comparison Numerical Images (PMCNI), Each Determined for a Matchup Pairing with the Same Matchup Target Numerical Image (MTNI)

Here, all of the comparison linked numerical images of FIG. 5A have been chosen as potential matchup comparison numerical images (PMCNI) for comparing with one or more matchup target numerical images (MTNI), one of which is MTNI6a. FIG. 5B includes all of the viewable images of FIG. 5A, relabeled to designate each comparison linked numerical image from which the viewable images are derived to be a potential matchup comparison numerical image. Specific Qualifying Metric Values were calculated for matchup pairings of each of the potential MCNI with MTNI6a. As part of a matchup comparison numerical image constraint, an SQMV inclusion range could be defined for any of these matchup pairings, leading to the qualifying or disqualifying of any of the PMCNI, but that has not been done for this example.

Example 3

Formation of Members of a Target Linked Numerical Image Set

In this example depicted by FIG. 6, four members (TLNI6b,c,d,e) of a target linked numerical image set have been formed from GNI6 through the operation of subdivision transforms. All four are available to be assigned to be matchup target numerical images (MTNI6b,c,d,e).

Example 4

Formation of Members of a Comparison Linked Numerical Image Set

In this example depicted by FIG. 7, four members (CLNI1b,c,d,e) of a target linked numerical image set have been formed from GNI1 through the operation of subdivision transforms. All four are available to be chosen to be matchup comparison numerical images (MCNI1b,c,d,e), or if a matchup CNI constraint is set for the step of choosing CLNI to be MCNI, all four would be available for designating to be potential matchup CNI (PMCNI1b,c,d,e).

Example 5

Calculation of Numerical Similarities for MCNI/MTNI Comparisons, and a Numerical Score Based Upon Comparing of One Matchup CNI with One Matchup TNI In this example depicted by FIG. 8, a player has selected MCNI1b to be compared with MTNI6b, and steps of calculating a comparison numerical descriptor and a target numerical descriptor, respectively, for them have led to the calculation of a numerical similarity of 0.460, which in this case is also the numerical score. These numerical similarities were computed using only the mean color overlap (MCO) described as a part of the SQMV calculation using the SQ Algorithm. Here, however, the MCO calculation is used independent of the SQ Algorithm and, as such, represents just one of the many ways a numerical similarity may be calculated, so long as that calculation provides some rational basis for comparing numerical images.

Example 6

Calculation of Numerical Similarities for MCNI/MTNI Comparisons, and a Numerical Score Based Upon Comparing Each of Two Matchup CNI with a Different Matchup TNI In this example depicted by FIG. 9, a player has selected MCNI1*b* for comparing with MTNI6*b* and MCNI1*e* for comparing with MTNI6*c*. The two numerical similarities of 0.460 and 0.401, respectively, were summed to calculate a numerical score of 0.861. These numerical similarities were computed using only the mean color overlap (MCO).

Example 7

Calculation of Numerical Similarities for MCNI/MTNI Comparisons, and a Numerical Score Based Upon Comparing Each of Three Matchup CNI with a Different Matchup TNI In this example depicted by FIG. 10, a player has selected MCNI1*b*, *e*, and *c* for comparing with MTNI6*b*, *c*, and *d*, respectively. The three numerical similarities of 0.460, 0.401, and 0.428, respectively, were summed to calculate a total numerical score of 1.289. These numerical similarities were computed using only the mean color overlap (MCO).

Example 8

Calculation of Numerical Similarities for MCNI/MTNI Comparisons, and a Numerical Score Based Upon Comparing Each of Three Matchup CNI with Different Matchup TNI, and Using One Matchup CNI Twice In this example depicted by FIG. 11, a player has selected MCNI1*b*, *e*, *c*, and *e* again for comparing with MTNI6*b*, *c*, *d*, and *e*, respectively. The four numerical similarities of 0.460, 0.401, 0.428, and 0.549, respectively, were summed to calculate a total numerical score of 1.838. These numerical similarities were computed using only the mean color overlap (MCO).

Example 9

Calculation of Numerical Similarities for MCNI/MTNI Comparisons, and a Numerical Score Based Upon Comparing Each of Four Matchup CNI with Different Matchup TNI In this example depicted by FIG. 12, a player has selected MCNI1*d*, *b*, *c*, and *e* for comparing with MTNI6*b*, *c*, *d*, and *e*, respectively. The four numerical similarities of 0.243, 0.308, 0.428, and 0.549, respectively, were summed to calculate a numerical score of 1.528. These numerical similarities were computed using only the mean color overlap (MCO).

Example 10

Calculation, Using an Alternative Calculation Algorithm, of Numerical Similarities for MCNI/MTNI Comparisons, and a Numerical Score Based Upon Comparing Each of Four Matchup CNI with Different Matchup TNI In this example depicted by FIG. 13, a player has selected MCNI1*b*, *c*, *e*, and *d* for comparing with MTNI6*b*, *c*, *d*, and *e*, respectively. The four numerical similarities of 0.816, 0.963, 0.957, and 0.943, respectively, were summed to calculate a numerical score of 3.679. Unlike Examples 5 through 9, wherein numerical similarities were calculated using only the mean color overlap (MCO), the numerical similarities of this example were calculated using only the edge ratio overlap (ERO) component of the SQ Algorithm, except that here the ERO calculation is used independent of the SQ Algorithm and, as such, represents another of the many ways a numerical similarity may be calculated, so long as that calculation provides some rational basis for comparing numerical images. As with Examples 5 through 9, the numerical score is calculated as the sum of the numerical similarities. This simple summation calculation is just one example of the many ways a numerical score can be calculated based upon one or more numerical similarity.

Example 11

Formation of Linked Numerical Image Sets from Germinal Numerical Images

In this example depicted in FIG. 14, five members of comparison numerical image sets CLNI1, 2, 3, and 4 have been derived from germinal numerical images GNI1, 2, 3, and 4. In each set, members "b" through "e" are linked to their respective originating GNI by the operation of a subdivision transform, and each member "a" (represented by the full viewable image in each case) is linked to its originating GNI by the operation of an identity transform.

Example 12

Calculation of Numerical Similarities for MCNI/MTNI Comparisons, and a Numerical Score Based Upon Comparing Each of Four Matchup CNI with Different Matchup TNI, Wherein Each Matchup CNI was Assigned from a Different CLNI Set In this example, 64 numerical similarities (FIG. 16) were calculated, using the mean color overlap (MCO), for all combinations of matchup comparison numerical images MCNI1*b-e*, 2*b-e*, 3*b-e*, and 4*b-e* (see Example 11 and FIG. 14) with matchup target numerical images MTNI6*b-e* (see Example 3 and FIG. 6). FIG. 15 depicts choices made by a player who has used player directives to indicate those choices. The numerical similarities calculated for the four pairings of FIG. 15 are circled in FIG. 16, and are summed to calculate a numerical score of 1.488 (FIG. 15).

Example 13

Calculation of Numerical Similarities for MCNI/MTNI Comparisons, and a Numerical Score Based Upon Comparing Each of Four Matchup CNI with Different Matchup TNI, Wherein Each Matchup CNI was Assigned from a Different CLNI Set In this example, 64 numerical similarities (FIG. 18) were calculated, using the mean color overlap (MCO), for all combinations of matchup comparison numerical images MCNI1b-e, 2b-e, 3b-e, and 4b-e (see Example 11 and FIG. 14) with matchup target numerical images MTNI6b-e (see Example 3 and FIG. 6). FIG. 17 depicts choices made by a player who has used player directives to indicate those choices. The numerical similarities calculated for the four pairings of FIG. 17 are circled in FIG. 18, and are summed to calculate a numerical score of 1.595 (FIG. 17). Here, the player improved the numerical score relative to the score for Example 12.

We claim:

1. A computer implemented method for an image construction game, the method comprising: at a computer system comprising one or more processors and non-transitory computer readable storage medium storing one or more programs, the one or more processors executing the one or more programs, performing the steps of:

A. providing a germinal numerical image library comprising one or more color germinal numerical image,
      wherein each germinal numerical image is a numerical image that is: available to initiate constructing of a linked numerical image set, through forming of one or more linked numerical image,
      wherein the linked numerical image is derived from the germinal numerical image through the operation of one or more transform operating in a specified order, and
      wherein a transform is a mathematical operation capable of transforming one numerical image into another numerical image;

B. constructing a target linked numerical image set, the constructing the target LNI set comprising the steps of:
      selecting a color germinal numerical image to be a germinal target numerical image; rendering the germinal target numerical image to form a tangible viewable germinal target numerical image; and
      populating the target linked numerical image set with one or more target linked numerical image, at least one of which is a color numerical image, and each of which is formed by the further steps of:
         specifying one or more transform;
         specifying an order in which the one or more transforms are to operate upon the germinal target numerical image to form the target linked numerical image; and
         forming the target linked numerical image through the operating, upon the germinal target numerical image, of the one or more transform in the specified order;

C. constructing a comparison linked numerical image set, the constructing the comparison LNI set comprising the steps of:
      selecting a color germinal numerical image to be a germinal comparison numerical image; rendering the germinal comparison numerical image to form a tangible viewable germinal comparison numerical image; and
      populating the comparison linked numerical image set with one or more comparison linked numerical image, at least one of which is a color numerical image, and each of which is formed by the further steps of:
         specifying one or more transform;
         specifying an order in which the one or more transforms are to operate upon the germinal comparison numerical image to form the comparison linked numerical image; and
         forming the comparison linked numerical image through the operating, upon the germinal comparison numerical image, of the one or more transform in the specified order;

D. assigning one or more target linked numerical image from one or more target linked numerical image set to be a matchup target numerical image, wherein the target linked numerical image is a color numerical image; and rendering the matchup target numerical image to form a tangible viewable matchup target numerical image;

E. choosing one or more comparison linked numerical image from one or more comparison linked numerical image set to be a matchup comparison numerical image, wherein the comparison linked numerical image is a color numerical image and wherein each matchup comparison numerical image has a Specific Qualifying Metric Value of at least zero and no more than 0.95, when compared to the germinal comparison numerical image from which it was formed; and rendering the matchup comparison numerical image to form a tangible viewable matchup comparison numerical image;

F. comparing one or more matchup comparison numerical image with one or more matchup target numerical image, wherein the comparing comprises the steps of:
      calculating a target numerical descriptor, based on the one or more matchup target numerical image;
      calculating a comparison numerical descriptor, based on the one or more matchup comparison numerical image; and
      calculating a numerical similarity, based on the comparison numerical descriptor and the target numerical descriptor;

G. calculating a numerical score, based on one or more numerical similarity; and
      displaying the numerical score by means of a graphical user interface element.

2. The method of claim 1, comprising the further step of repeating one or more of steps B through G, until an outcome is achieved, wherein:
   options for repeating of each of steps B and C are selected from: repeating the entire step and repeating the populating only; and
   the outcome signals the completion of a round of game play.

3. The method of claim 2, wherein the outcome is selected from: attaining one or more numerical scores; elapsing of a certain time period; attaining a certain numerical score threshold; completing a set of activities specified by game design; and prematurely terminating the round of game play.

4. The method of claim 1, wherein:
   a player participates in the step E of choosing one or more comparison linked numerical image by choosing at least one of the one or more comparison linked numerical images, each of which is a color numerical image; and
   a player further participates in one or more step selected from: selecting a germinal numerical image, specifying one or more transform, specifying an order in which the one or more transforms are to operate, and assigning one or more target linked numerical image to be a matchup target numerical image, by accomplishing, respectively, one or more of:
      selecting at least one germinal numerical image;
      specifying at least one transform;
      specifying an order in which the transforms are to operate; and assigning at least one comparison linked numerical image to be a matchup comparison numerical image.

5. The method of claim 1, comprising the further step of setting a game play constraint.

6. The method of claim 5, wherein the game play constraint is selected from:
a numerical image constraint; a viewable image constraint; a time constraint; a transform type constraint; a transform sequence constraint; a matchup comparison image constraint; and combinations thereof.

7. A computer system for implementing the image construction game of claim 1 comprising: a non-transitory computer-readable storage medium wherein the storage medium comprises a computer-executable program for performing the method of claim 1, and a processor in communication with the storage medium; wherein the system further comprises: a germinal numerical image library; a user interface controller; a germinal numerical image library providing component for providing the germinal numerical image library; a numerical image transformation component for transforming one numerical image into another numerical image; a target LNI set construction component for constructing a target linked numerical image set; a comparison LNI set construction component for constructing a comparison linked numerical image set; a target LNI assignment component for assigning one or more target linked numerical image to be a matchup target numerical image; a comparison LNI choice component for choosing a comparison linked numerical image to be a matchup comparison numerical image; a matchup numerical image comparing component for comparing one or more matchup comparison numerical image with one or more matchup target numerical image; and a numerical score calculation component for calculating a numerical score.

8. The system of claim 7, further comprising at least one component selected from: a rendering component for rendering a color numerical image to form a viewable image; a comparison LNI qualification component for qualifying a comparison linked numerical image to be a matchup comparison numerical image; a graphical user interface for facilitating communication between computer hardware and software and a player having visual capability; and a game play option recorder for recording game play options.

9. An image processing apparatus for implementing the image construction game of claim 1 comprising:
A. a non-transitory computer-readable storage medium further comprising:
a computer-executable program for performing the method of claim 1, and
a numerical image storing section;
B. a derivative numerical image calculator for calculating:
a comparison linked numerical image from a germinal numerical image, a target linked numerical image from a germinal numerical image; and combinations thereof;
C. a numerical descriptor calculator for: calculating a target numerical descriptor, based on the one or more matchup target numerical image; and calculating a comparison numerical descriptor, based on the one or more matchup comparison numerical image;
D. a numerical similarity calculator for calculating a numerical similarity, based on the comparison numerical descriptor and the target numerical descriptor; and
E. a numerical score calculator for calculating a numerical score, based on one or more numerical similarity.

10. The image processing apparatus of claim 9, further comprising a qualifying metric value calculator for calculating a qualifying metric value according to a qualifying algorithm.

11. The method of claim 1 wherein each matchup comparison linked numerical image has a Specific Qualifying Metric Value of at least zero and no more than 0.90, when compared to the germinal comparison numerical image.

12. The method of claim 1 wherein each matchup comparison linked numerical image has a Specific Qualifying Metric Value of at least zero and no more than 0.80, when compared to the germinal comparison numerical image.

13. The method of claim 1 wherein each matchup comparison linked numerical image has a Specific Qualifying Metric Value of at least zero and no more than 0.70, when compared to the germinal comparison numerical image.

14. The method of claim 1 wherein each matchup comparison linked numerical image has a Specific Qualifying Metric Value of at least zero and no more than 0.50, when compared to the germinal comparison numerical image.

15. The method of claim 1 wherein the Step E choosing one or more comparison linked numerical image from one or more comparison linked numerical image set to be a matchup comparison numerical image further comprises a qualifying step determining whether a chosen comparison linked numerical image is qualified to be a matchup comparison numerical image, wherein the qualifying step comprises the further steps of:
designating each chosen comparison linked numerical image to be a potential matchup comparison numerical image;
defining a qualifying metric value inclusion range,
wherein the qualifying metric value inclusion range contains one or more qualifying metric value,
wherein a qualifying metric value is a value calculated according to a Qualifying Algorithm, based upon a matchup pairing, wherein a matchup pairing is a pairing of a single potential matchup comparison numerical image and a single matchup target numerical image, and
wherein the qualifying metric value inclusion range contains less than all possible qualifying metric values;
for each potential matchup comparison numerical image:
calculating a qualifying metric value for each matchup pairing;
determining whether the matchup pairing has a qualifying metric value within the qualifying metric value inclusion range;
upon determining that the matchup pairing has a qualifying metric value within the qualifying metric value inclusion range, qualifying the potential matchup comparison numerical image to be a matchup comparison numerical image; and
repeating the choosing until at least one potential matchup comparison numerical image has been qualified to be a matchup comparison numerical image.

16. The method of claim 15, wherein:
the qualifying metric value is a Specific Qualifying Metric Value;
the qualifying algorithm is the Specific Qualifying Algorithm; and
the qualifying metric value inclusion range is the Specific Qualifying Metric Value inclusion range.

17. The method of claim 16, wherein the SQMV inclusion range is a range of specific qualifying metric values from at least 0.2 to no more than exactly one.

18. The method of claim 15, wherein the QMV inclusion range is a range of qualifying metric values from at least 20 percent to no more than exactly 100 percent of the full range of all possible qualifying metric values.

19. The method of claim 15, wherein: the Qualifying Algorithm is the Specific Qualifying Algorithm; the qualifying metric value is the Specific Qualifying Metric value; and the qualifying metric value inclusion range is the Specific Qualifying Metric value inclusion range.

20. The method of claim 1 wherein the graphical user interface element is selected from a progress bar, a text label displaying the current numerical score, a dial type indicator, and a meter type indicator.

\* \* \* \* \*